(12) United States Patent
Sengoku

(10) Patent No.: US 9,681,049 B2
(45) Date of Patent: Jun. 13, 2017

(54) SYSTEM AND METHODS FOR DAMPING LENS RINGING

(71) Applicant: QUALCOMM Incorporated, San Diego, CA (US)

(72) Inventor: Shoichiro Sengoku, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 14/693,656

(22) Filed: Apr. 22, 2015

(65) Prior Publication Data

US 2016/0062134 A1 Mar. 3, 2016

Related U.S. Application Data

(60) Provisional application No. 62/044,864, filed on Sep. 2, 2014.

(51) Int. Cl.
*H04N 5/232* (2006.01)
*G03B 13/36* (2006.01)
(Continued)

(52) U.S. Cl.
CPC ....... *H04N 5/23264* (2013.01); *G02B 27/646* (2013.01); *G03B 13/36* (2013.01);
(Continued)

(58) Field of Classification Search
CPC ........... H04N 5/23264; H04N 5/23248; H04N 5/23212; H04N 5/23287; H04N 5/23258;
(Continued)

(56) References Cited

U.S. PATENT DOCUMENTS

| 8,190,015 B2* | 5/2012 | Li | H04N 5/23212 |
| | | | 396/135 |
| 8,379,903 B2* | 2/2013 | Ko | G02B 7/28 |
| | | | 381/400 |

(Continued)

FOREIGN PATENT DOCUMENTS

WO WO-2009032934 A2 3/2009

OTHER PUBLICATIONS

International Search Report and Written Opinion—PCT/US2015/044269—ISA/EPO—Nov. 4, 2015.

*Primary Examiner* — Albert Cutler
(74) *Attorney, Agent, or Firm* — Knobbe Martens Olson & Bear, LLP

(57) ABSTRACT

Methods and systems are disclosed for damping unwanted vibrations or ringing of a lens in an imaging device. For example, one method includes determining a target distance to move a lens, and dividing the target distance into multiple steps having at least a first step and a subsequent step, moving the lens, via an actuator, by the first step, thereby causing a first vibration, retrieving a damping parameter indicative of a time delay, the damping parameter being based on at least one characteristic of the actuator and the number of steps, and repeating said moving the lens at least one subsequent step after delaying the subsequent step by one of the damping parameters, each moving the lens a subsequent step causing a subsequent vibration, and the damping parameters affecting the vibration such that the first and subsequent vibrations at least in part modify each other to lower overall vibration.

26 Claims, 14 Drawing Sheets

(51) Int. Cl.
*G02B 27/64* (2006.01)
*H04N 101/00* (2006.01)

(52) U.S. Cl.
CPC ..... *H04N 5/23212* (2013.01); *H04N 5/23248* (2013.01); *H04N 5/23258* (2013.01); *H04N 5/23287* (2013.01); H04N 2101/00 (2013.01); H04N 2201/046 (2013.01); H04N 2201/0428 (2013.01)

(58) Field of Classification Search
CPC ....... H04N 2201/0428; H04N 2101/00; H04N 2201/046; G02B 27/646; G03B 13/36
See application file for complete search history.

(56) References Cited

U.S. PATENT DOCUMENTS

| | | | |
|---|---|---|---|
| 9,049,366 B2* | 6/2015 | Zhang | H04N 5/23212 |
| 2011/0156763 A1* | 6/2011 | Gao | G02B 7/08 |
| | | | 327/108 |
| 2013/0286491 A1 | 10/2013 | Hung et al. | |
| 2015/0116579 A1* | 4/2015 | Zhang | H04N 5/23212 |
| | | | 348/357 |

\* cited by examiner

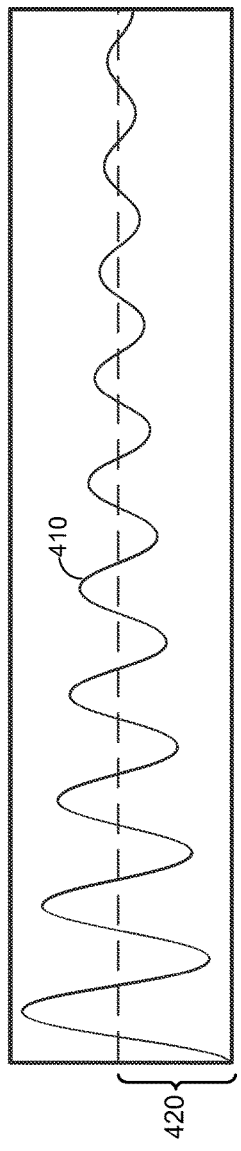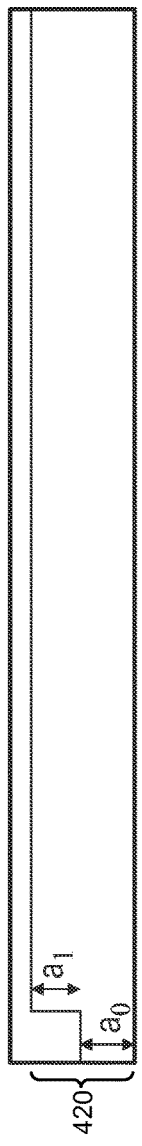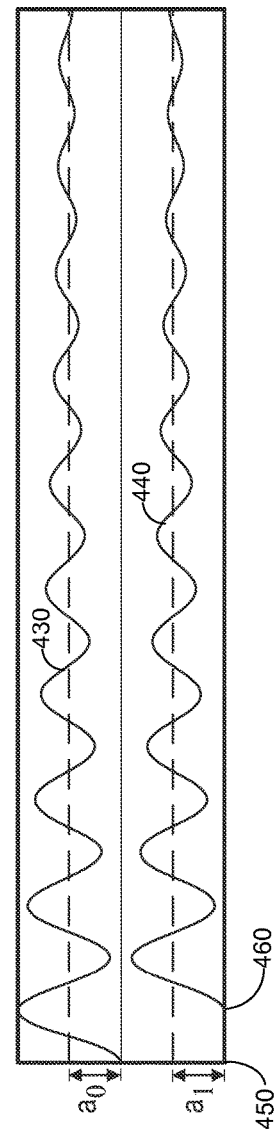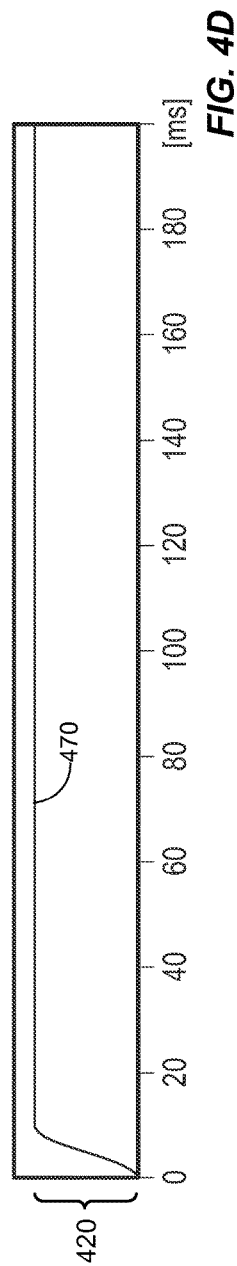

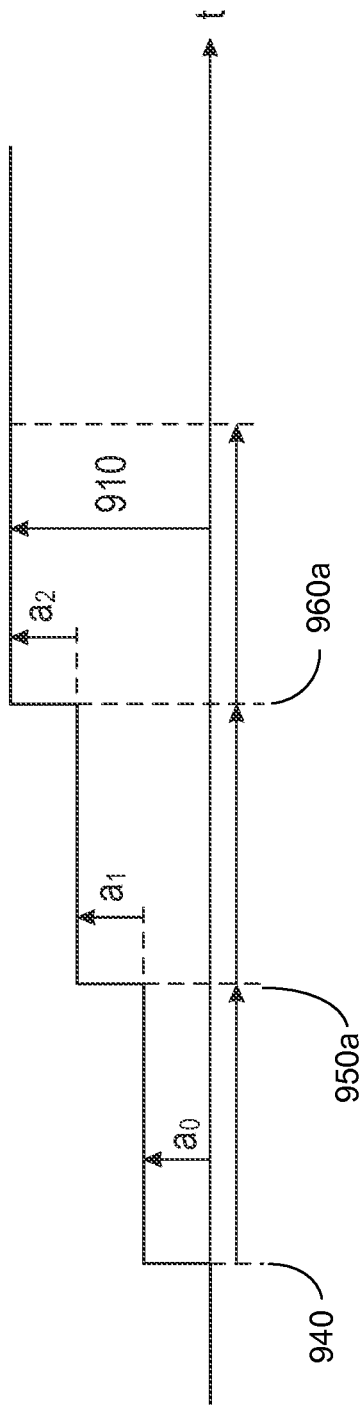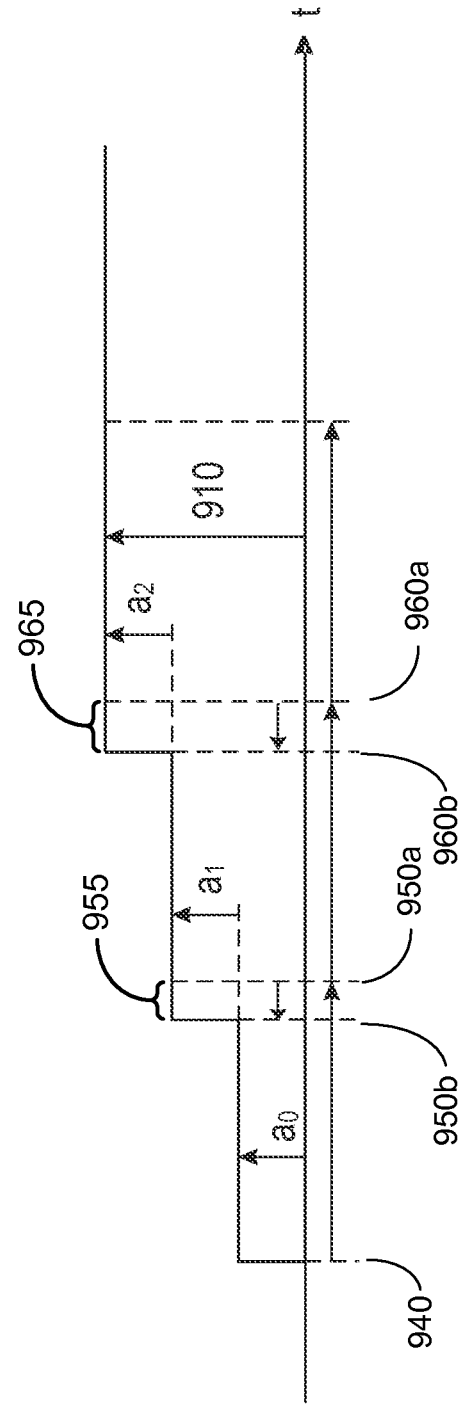

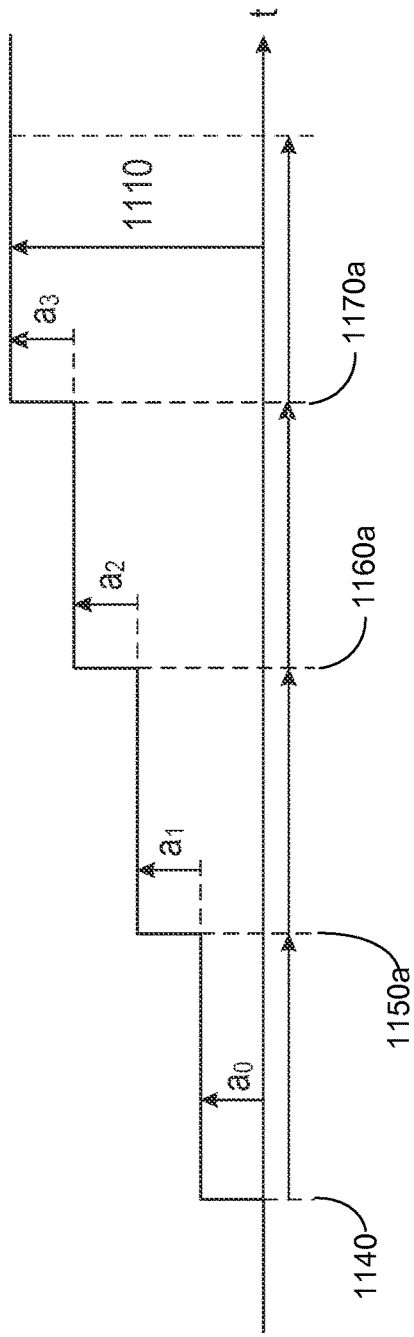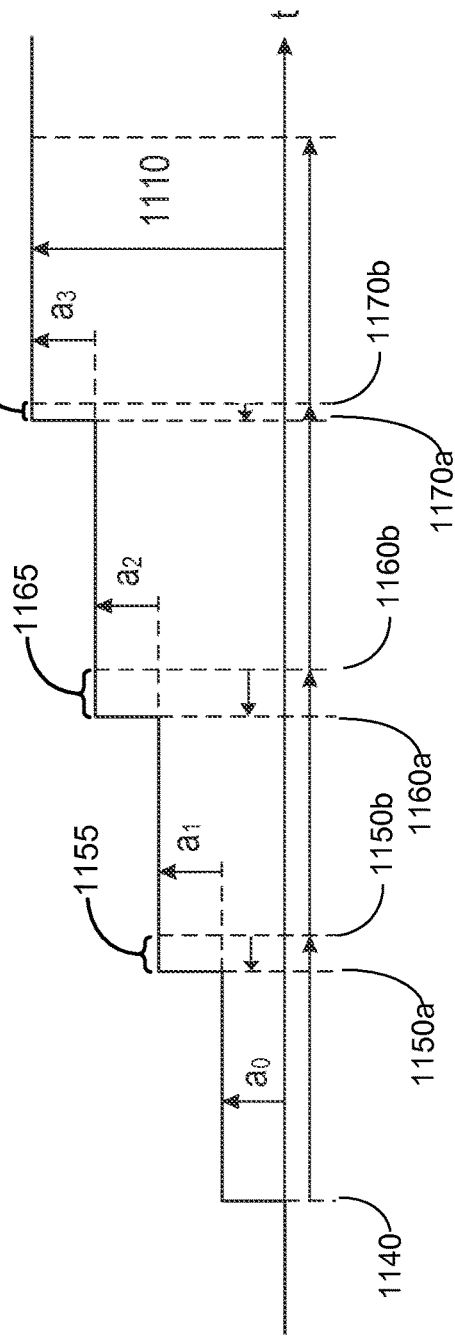
FIG. 11A
FIG. 11B

SYSTEM AND METHODS FOR DAMPING LENS RINGING

CROSS-REFERENCE TO RELATED APPLICATIONS

This disclosure claims priority to U.S. Provisional Patent Application No. 62/044,864 filed Sep. 2, 2014, entitled "METHODS AND SYSTEMS FOR SWEET SPOT AND FAST VOICE COIL MOTOR SOFTWARE DAMPING" and assigned to the assignee hereof. The disclosure of this prior application is considered part of, and is incorporated by reference in, this disclosure.

TECHNICAL FIELD

The present embodiments relate to imaging devices, and in particular, to methods and apparatus for reducing ringing, damping vibrations, and reducing the time to automatically focus an imaging device.

BACKGROUND

Digital imaging devices with an adjustable focus may use one of many types of lens actuators, including a voice coil motor (VCM) actuator, a microelectromechanical systems (MEMS) actuator, or a Shape Memory Alloy (SMA) actuator etc. Image capture devices may also have a lens driver controlling an actuator that moves a lens assembly for adjusting focus in the image capture device. During operation of the actuator to adjust the position of the lens, vibration may be introduced to the lens.

This vibration may come from many sources. For example, in a lens adjustment mechanism employing a voice coil motor design, the stimuli for movement of the lens induces vibration in springs supporting the lens. The vibration of the lens may continue for some time before settling at the desired lens position. For example, this vibration or ringing of the lens may last anywhere from approximately 50 milliseconds to approximately 200 ms, and can adversely affect autofocus (AF) speed and accuracy. The ringing may also adversely affect desired image capture settings and hence image quality. To mitigate the adverse effects of lens ringing, imaging devices may wait a predetermined threshold period of time after completing a lens movement before capturing an image with the lens. This predetermined threshold period of time may allow the lens to stop ringing before an image is captured, but also reduces the speed of autofocus operation.

The need for an imaging device to wait for a predetermined threshold period of time after completing a lens movement may have adverse effects on the speed at which an imaging device may capture images. For example, in imaging environments with dynamic scenes and focus conditions, a photographer may desire to minimize any delay between when a scene is presented and when the scene may be captured by an imaging device. To the extent the imaging device introduces a delay in image capture to provide for any lens ringing to settle, the captured image may vary from the image selected by the photographer. Similarly, video image capture may also be adversely affected by lens ringing, given the frame rate at which most video is recorded. Existing solutions may not adequately dampen vibrations or ringing within a single ring period. Accordingly, there is a need for systems and methods that dampen ringing and vibration for cameras using autofocus systems to reduce autofocus time, reduce ringing, reduce vibration, and improve image quality.

SUMMARY

The systems, methods, and devices of the disclosure each have several innovative aspects, no single one of which is solely responsible for the desirable attributes disclosed herein. Combinations of the innovations, aspects and features described herein can be incorporated in various embodiments of systems, methods, and devices, and such combinations are not limited by the examples of embodiments described herein.

According to one aspect, a method for damping unwanted lens movement in an imaging device is disclosed. The method includes determining a target distance to move a lens by an actuator to focus a scene on an image sensor and dividing the target distance into a multiple steps having a first step and at least one subsequent step. In some embodiments, the multiple steps are substantially equal. The method further includes moving the lens the first step, via the actuator. The moving the lens the first step causes a first vibration. The method also includes retrieving a damping parameter indicative of a time delay before each subsequent step. In some embodiments, the damping parameter is an optimized time delay having a time delay and an associated lag. In some embodiments, the lag is uniquely based on at least one characteristic of the actuator. In other embodiments, the lags are selected based on at least one characteristic of the actuator to minimize vibrations in the lens. The damping parameter is based on at least one characteristic of the actuator and the number of the plurality of steps. In some embodiments, the damping parameter is based on a ringing angular velocity and/or a damping ratio of the lens actuator. The method includes repeating moving the lens at least one subsequent step after delaying the subsequent step by one of the damping parameters. Moving the lens by each subsequent step causes a corresponding subsequent vibration, where the damping parameters affects the vibration caused by each step such that the first and subsequent vibrations at least in part modify each other to lower overall vibration. In some embodiments, the first and subsequent vibrations modify each other such that the first and subsequent vibrations substantially cancel each other out.

In some embodiments, the first and subsequent vibrations are characterized by sinusoidal ringing imparted to the lens from to the actuator, where the sinusoidal ringing is related to vibrations and friction resulting from said moving the lens. The sinusoidal ringing may be characterized by at least on characteristic of the actuator, such as a ring period, ringing angular velocity, and/or damping ratio. The ring period, ringing angular velocity, and damping ratio are related to the vibrations and friction resulting from the actuator moving the lens. In some embodiments, the capturing of the scene on the image sensor is a result of moving the lens by the actuator through the multiple steps, where the first and subsequent vibrations are modified within a single ringing period. The method may further include a configuration period that is equal to the ring period, where the configuration period is related to the amount of time to move the lens the target distance and for the first and subsequent vibrations to settle.

According to another aspect, an apparatus for damping lens movement imparted on a lens by an actuator in an imaging device is disclosed. The apparatus includes a lens, a lens actuator, a processor operably coupled to the lens actuator, and a memory operably coupled to the processor.

The memory is configured to store an autofocus module, a damping parameter determination module, a lens movement parameter determination module, and a lens movement control module. The autofocus module is configured to determine a current lens position and a target lens position, where the distance between the current lens position and target lens position is a target distance. The damping parameter determination module is configured to determine damping parameters based on at least one characteristic of the actuator. The lens damping parameter includes multiple steps having a total distance that is equal to the target distance and a delay between each of the multiple steps. The damping parameters are determined to substantially cancel out vibration imparted to the lens due to the actuator moving the lens of each of the plurality of steps. The lens movement parameter determination module is configured to determine lens movement parameters based on the damping parameters. The lens movement control module is configured to move the lens to autofocus an image based on the lens movement parameters.

In some embodiments, the apparatus further includes a lens actuator characteristic determination module. The lens actuator characteristic determination module is configured to determine one or more characteristics of the actuator, where the actuator characteristics are stored in the memory of the apparatus. In some embodiments, the lens actuator characteristics determination module is configured to perform a calibration process to determine characteristic of the actuator. In some embodiments, the characteristic of the actuator includes at least a ring period, a damping ratio, and a ringing angular velocity. The damping ratio may be related to the vibration and friction imparted to the lens by the actuator moving the lens, and the ringing angular velocity may related to the ring period.

According to another aspect, an apparatus for damping lens ringing imparted on a lens in an imaging device is disclosed. The apparatus includes a means for determining a current lens position and a target lens position, where the distance between the current lens position and target lens position is a target distance. The apparatus also includes a means for determining damping parameters based on at least one characteristic of an actuator. The damping parameters include multiple steps having a total distance that is equal to the target distance, and a delay between each of the multiple steps. In some embodiments, the delay includes a time delay and an optimized lag. In some embodiments, the optimized lag is a function of the damping ratio and the ringing angular velocity. The damping parameters are determined to substantially cancel out lens vibrations imparted to the lens as a result of the actuator moving the lens each of the plurality of steps. The apparatus further includes a means for determining lens movement parameters based on the damping parameters, and a means for moving the lens to autofocus an image based on the lens movement parameters.

According to another aspect, an non-transitory computer readable medium having instructions stored thereon that when executed cause a processor to perform a method of autofocusing a lens is disclosed. The method performed by the executed code includes determining a target distance to move a lens by an actuator toward or away from an image sensor to focus a scene on the image sensor and dividing the target distance into multiple steps having at least a first and subsequent step. The method also includes moving the lens by the first step, via the actuator, where the moving the lens of the first step causes a first vibration. The method further includes retrieving a damping parameter indicative of a time delay before each subsequent step, where the damping parameter is based on at least one characteristic of the actuator and the number of steps. The method also includes repeating the moving of the lens at least one subsequent step after delaying the subsequent step by one of the damping parameters, where each moving of the lens a subsequent step causes a corresponding subsequent vibration. The method further includes repeating moving the lens at least one subsequent step after delaying the subsequent step by one of the damping parameters. Moving the lens by each subsequent step causes a corresponding subsequent vibration, where the damping parameters affects the vibration caused by each step such that the first and subsequent vibrations at least in part modify each other to lower overall vibration.

Details of one or more implementations of the subject matter described in this specification are set forth in the accompanying drawings and the description below. Other features, aspects, and advantages will become apparent from the description, the drawings, and the claims.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 4A illustrates the vibration of a lens in an imaging device during an autofocus search.

FIG. 4B illustrates movement of a lens in an imaging device in accordance with one embodiment.

FIG. 4C illustrates vibrations of a lens in an imaging device related to lens movements in accordance with one embodiment.

FIG. 4D illustrates reducing lens vibration imparted to a lens during lens movement in accordance with one embodiment.

FIG. 9A is a diagram that illustrates an example of a three-step method of reducing lens vibration imparted to a lens during lens movement in accordance with one embodiment.

FIG. 9B is a diagram that illustrates an example of an optimal three-step method of reducing lens vibration imparted to a lens during lens movement in accordance with one embodiment.

FIG. 11A is a diagram that illustrates an example of a four-step method of reducing lens vibration imparted to a lens during lens movement in accordance with one embodiment.

FIG. 11B is a diagram that illustrates an optimal four-step method of reducing lens vibration imparted to a lens during lens movement in accordance with one embodiment.

DETAILED DESCRIPTION OF CERTAIN EMBODIMENTS

Figure 1:
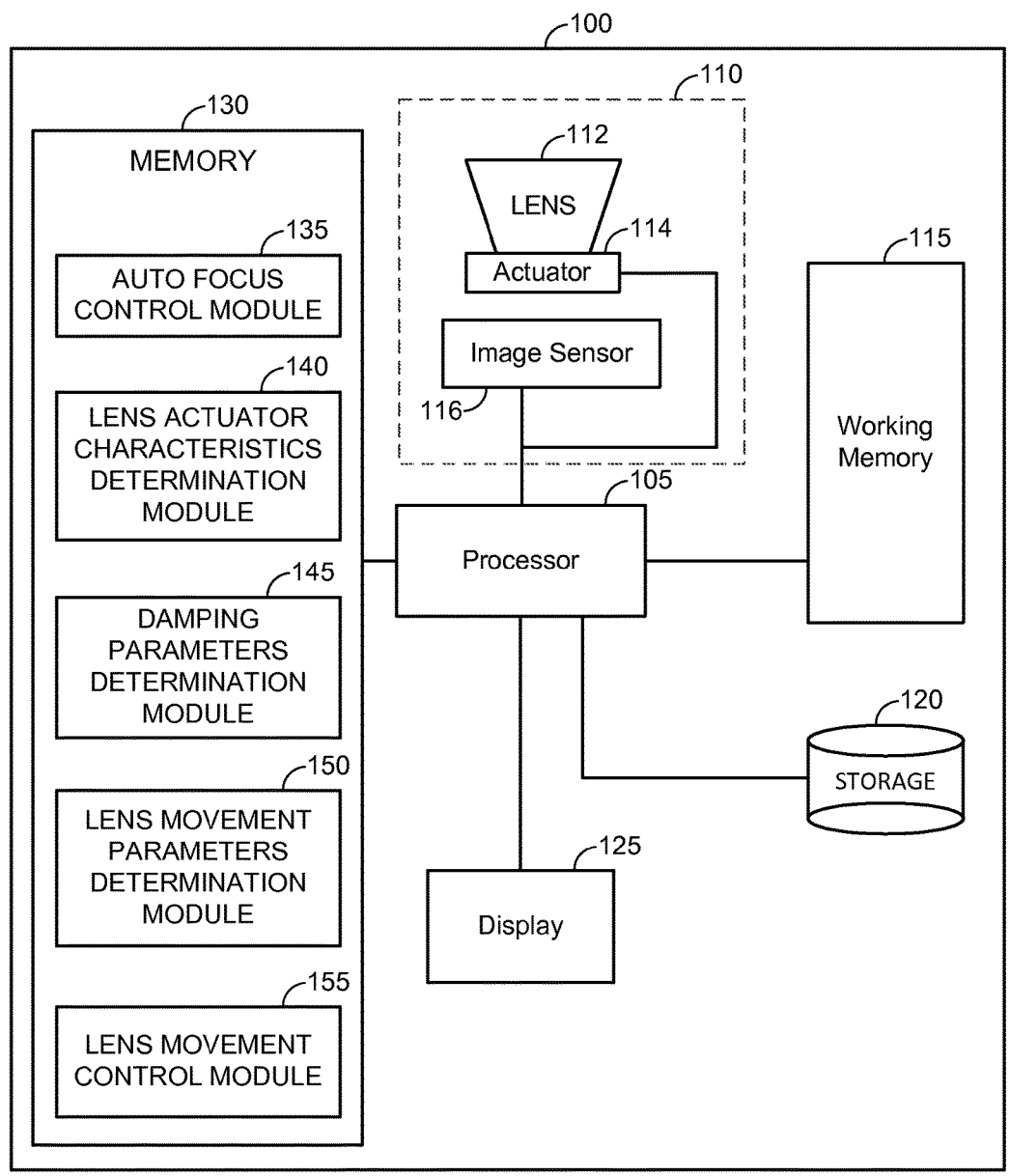
FIG. 1 is a block diagram of an imaging device implementing one of the disclosed embodiments.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Embodiments include methods, apparatus, and computer readable media that are configured to reduce ringing (or vibrations) of a lens. In some embodiments, the method may be directed to method and image capture device that can break a determined lens movement into smaller steps in an effort to dampen the ring generated by any lens actuators, for example but not limited to, a VCM actuator, a MEMS actuator, or a SMA actuator. By damping the ringing of the lens, the lens may be in a stable (non-moving or substantially non-moving) condition in a shorter amount of time after the lens moves. This may result in potential improvements in AF speed and overall accuracy, thereby improving image quality in the image capture device. Accordingly, one embodiment introduces a software solution to limit or dampen the amount of ring or vibration in springs of a lens actuator during an autofocus operation.

In some embodiments of the methods and apparatus, the lens movement may be adjusted based on lens actuator characteristics and/or damping parameters. For example, some lens actuators may exhibit characteristics such as variations in lens displacement as a result of vibrations and friction as the actuator acts on a lens.

In some embodiments, variations in actuator displacement may be considered when moving the lens to affect an autofocus operation. For example, the movement of the lens may be adjusted to reduce or mitigate ringing or vibration of the lens resulting from movement by the actuator. Damping parameters may be determined to effect this adjustment. In one embodiment, damping parameters may be stored in the device. In another embodiment, damping parameters may be determined in a calibration phase of the device. How movement of the lens is adjusted by the damping parameters may vary based on the actuator characteristics. The distance the actuator moves the lens may be referred to as a target distance or target lens displacement. In one embodiment, the target lens displacement or distance may be divided into multiple smaller movements or steps. In some embodiments, the distance of each smaller movement (steps) may be equal. In other embodiments, each step may be varied in distance. In other words, each step, or at least one of the steps, may be of a different distance (length).

In one aspect according to the disclosure herein, the damping parameter may be indicative of a time delay, such as the time between respective lens steps. In one embodiment, the time between respective smaller lens movements may be constant, for example, an increment of time may be selected to delay each of the movements. In another embodiment, the total time for all lens movements may be equal to or less than an image frame. In yet another embodiment, the amount of time between each respective smaller movement may be varied based on actuator characteristics. The amount to vary each smaller movement may be constant and/or may be different as a function of lens position, actuator characteristics, and the number of steps. For example, the amount of time between steps for a given target distance may be different if two steps are used as compared to using three or four steps to move the target distance. The amount of delay for each of the smaller lens movements may be determined to an optimized delay for each step to reduce or mitigate ringing or vibrations of the lens during an autofocus operation. The optimized delay may include a time delay and a lag that may be either added to or subtracted from the time delay.

Additionally, the distance of a lens movement and/or the distance of multiple lens movements may affect the type and degree of ringing induced by the movement. For example, moving a lens a greater distance may cause the lens to ring more severely than when the lens is moved a shorter distance. The damping parameter for each of the multiple lens movements may be adjusted based on the lens movement distance for each of the multiple lens movements. For example, different damping parameter may be applied to different lens movement distances, regardless of the number of lens movements. As a result, damping parameters may be adjusted to actively mitigate the effects of lens ringing based on the lens movement distance.

FIG. 1 is a block diagram of an example of an imaging device according to some embodiments. Imaging device 100 includes a processor 105 which is operably connected to a sensor module 110, working memory 115, storage 120, display 125, and memory 130. The sensor module 110 may include a lens 112, an actuator 114, and an image sensor 116. Light enters the lens 112 and is focused on the image sensor 116. In one aspect, the image sensor 116 utilizes a charge coupled device. In another aspect, the image sensor 116 utilizes either a CMOS or CCD sensor. The lens 112 is coupled to the actuator 114, and is moved by the actuator 114. The actuator 114 is configured to move the lens 112 in a series of one or more lens movements through a displacement range. When the lens 112 reaches a boundary of its displacement range, the lens 112 or actuator 114 may be referred to as saturated. The lens 112 may be actuated by any method known in the art including a voice coil motor (VCM), Micro-Electronic Mechanical System (MEMS), or a shape memory alloy (SMA).

The working memory 115 may be utilized by the processor 105 to store data dynamically created during operation of the imaging device 100. For example, instructions from any of the modules stored in the memory 130 (discussed below) may be stored in working memory 115 when executed by the processor 105. The working memory 115 may also store dynamic run time data, such as stack or heap data utilized by programs executing on processor 105. The storage 120 may be utilized to store data created by imaging device 120. For example, images captured via lens 112 may be stored on storage 120. The display 125 is configured to display images captured via lens 112 and may also be utilized to implement configuration functions of device 100.

Figure 7:
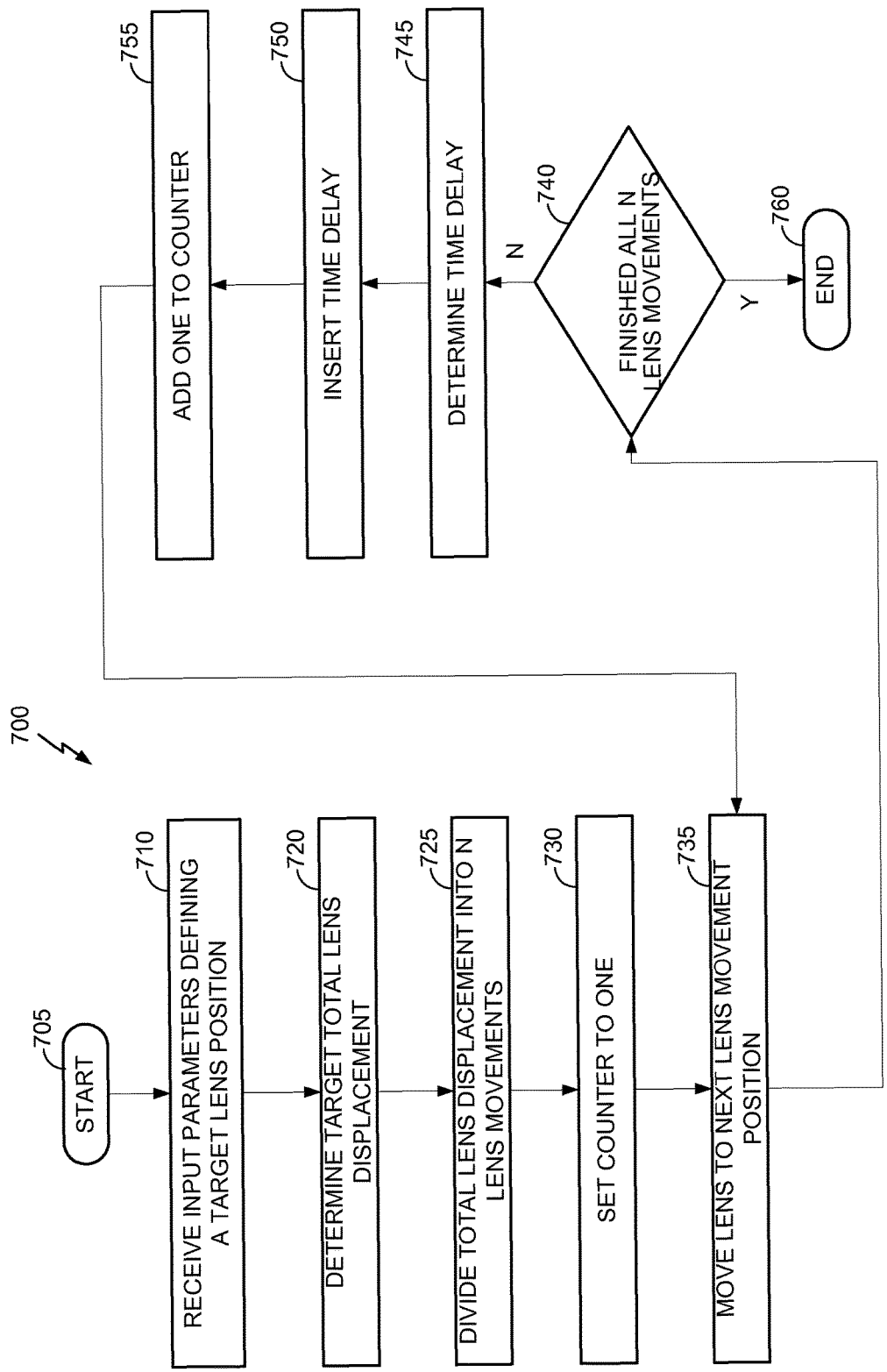
FIG. 7 is a flowchart of an example of a method for reducing lens vibration imparted to a lens during lens movement in accordance with one embodiment.

The memory 130 may be considered a computer readable media and stores several modules. The modules store data values defining instructions for processor 105. These instructions configure the processor 105 to perform functions of device 100. For example, in some aspects, memory 130 may be configured to store instructions that cause the processor 105 to perform method 700, or portions thereof, as described below and as illustrated in FIG. 7. In the illustrated embodiment, the memory 130 includes an autofocus control module 135, lens actuator characteristics determination module 140, a lens damping parameters determination module 145, a lens movement parameters determination module 150, and a lens movement control module 155.

The autofocus control module 135 includes instructions that configure processor 105 to autofocus the lens 112. Instructions in the autofocus control module 135 may configure processor 105 to effect a lens position for lens 112. In an embodiment, the instructions in the autofocus control module 135 may send the lens position information, along with other input parameters, to the lens actuator characteristic determination module 140. The lens position information may include a current lens position and a target lens position. In another embodiment, the autofocus control module 135 may send lens position information to the damping parameters determination module 145 discussed below. Therefore, instructions in the autofocus control module 135 may be one means for generating input parameters defining a lens position. In some aspects, instructions in the autofocus control module 135 may represent one means for determining a current and/or target lens position. Instructions in the damping parameters determination module 145 or instructions in the lens actuator characteristics determination module 140 may represent one means for receiving input parameters defining a lens position. In some aspects, instructions in the autofocus control module 135 may represent one means for determining a magnitude and/or direction of lens movement based on at least a current and target lens position.

Instructions in the lens actuator characteristics determination module 140 may configure the processor 105 to determine actuation characteristics of the lens 112. In some aspects, a movement of the lens may include one or more smaller movements with the total lens movement corresponding to a (total) target lens movement. In another aspect, the timing between the one or more smaller lens movements may be varied in response to the lens ringing characteristics. Because the actuation characteristics vary by lens ringing parameters and target lens position, the actuation characteristics may be based, at least in part, on a current lens position of the lens 112.

The lens actuator characteristics determination module 140 may determine the characteristics based, at least in part, on one or more parameters stored in memory 130. For example, the characteristics may be known when the device 100 is manufactured, for example, based on a model or type of lens 112 and/or its actuator 114. Alternatively, a calibration process may be performed during the manufacturing or during operation of device 100 that determines actuation characteristics of lens 112 and stores parameters defining the characteristics in memory 130. Therefore, instructions in the lens actuator characteristics determination module 140 may represent one means for determining lens actuator characteristics. Instructions in the lens actuator characteristics determination module 140 may also represent one means for determining at least two lens movement positions based on a current lens position and a target lens position (for example, a desired lens positions to achieve a focus at a certain distance). Instructions in the lens characteristic determination module 140 may also represent one means for determining at least one time delay associated with at least one lens movement positions.

Instructions in the lens damping parameters determination module 145 may configure processor 105 to determine damping parameters, based, at least in part, on the lens actuator characteristics determined in the lens actuator characteristics determination module 140. The damping parameters may also be determined based on input parameters defining a target lens position, generated by the autofocus control module 135. The damping parameters may also be determined based on a current lens position of lens 112. In some aspects, the damping parameters may be determined based on a lens movement direction and/or lens movement magnitude. The direction and magnitude may be based, at least in part, on the current and target lens position. The damping parameters may also be determined based on amount of time to effectuate a lens movement. In some aspects, the damping parameters may be determined based on the time associated with capturing at least one image frame. For example, the total time it takes to determine a lens movement move the lens to the desired lens position, and capture an image at that lens position. Therefore, instructions in the lens damping parameters determination module 145 may represent one means for determining damping parameters, based, at least in part, on the input parameters and on lens actuator characteristics.

In some cases, moving the lens 112 from a current position to a target position may cause the lens to traverse one or more lens movement positions. These lens movement positions may be determined by the damping parameters determination module 145. Instructions in the damping parameters determination module 145 may also represent one means for determining at least two lens movement positions based on a current lens position and a target lens position. Instructions in the lens damping parameters determination module 145 may represent one means for determining at least the lens movement damping parameters based on a target position and time restrictions for moving the lens 112. In some embodiments, the damping parameters for each lens movement position may include a time delay. Instructions in the damping parameters determination module 145 may represent one means for determining a time delay corresponding to the lens movement positions. In some embodiments, the time delay may be based on lens actuator characteristics, e.g., a ringing period and/or a ringing coefficient as detailed below in reference to FIG. 2. In another embodiment, the damping parameters determination module 145 may be configured to provide instructions to determine an optimized time delay. The damping parameters determination module 145 may be configured to utilize a time lag to optimize a time delay for improved mitigation techniques. Therefore, instructions in the damping parameters determination module 145 may represent one means for determining damping parameters based, at least in part, on the input lens actuator characteristics.

Instructions in the lens movement parameters determination module 150 configure processor 105 to determine lens movement parameters based, at least in part, on the damping parameters and the input parameters generated by autofocus control module 135. For example, the movement parameters may be based on a target lens position of lens 112. The movement parameters may also be based on the positions through which the lens moves. For example, lens movement damping parameters may specify a lens movement step size and time delay, with or without an optimized time lag, between each step that varies by position. Therefore, instructions in the lens movement parameters determination module 150 may represent one means for determining lens movement parameters based, at least in part, on the input parameters and the lens damping parameters.

Instructions in the lens movement control module 155 configure processor 105 to move the lens 112 based on the lens movement parameters. By moving the lens 112, lens movement control module 155 may affect an autofocus of lens 112. Therefore, instructions in the lens movement control module 155 represent one means for moving the lens 112 based on the lens movement parameters to autofocus the lens 112.

Figure 2:
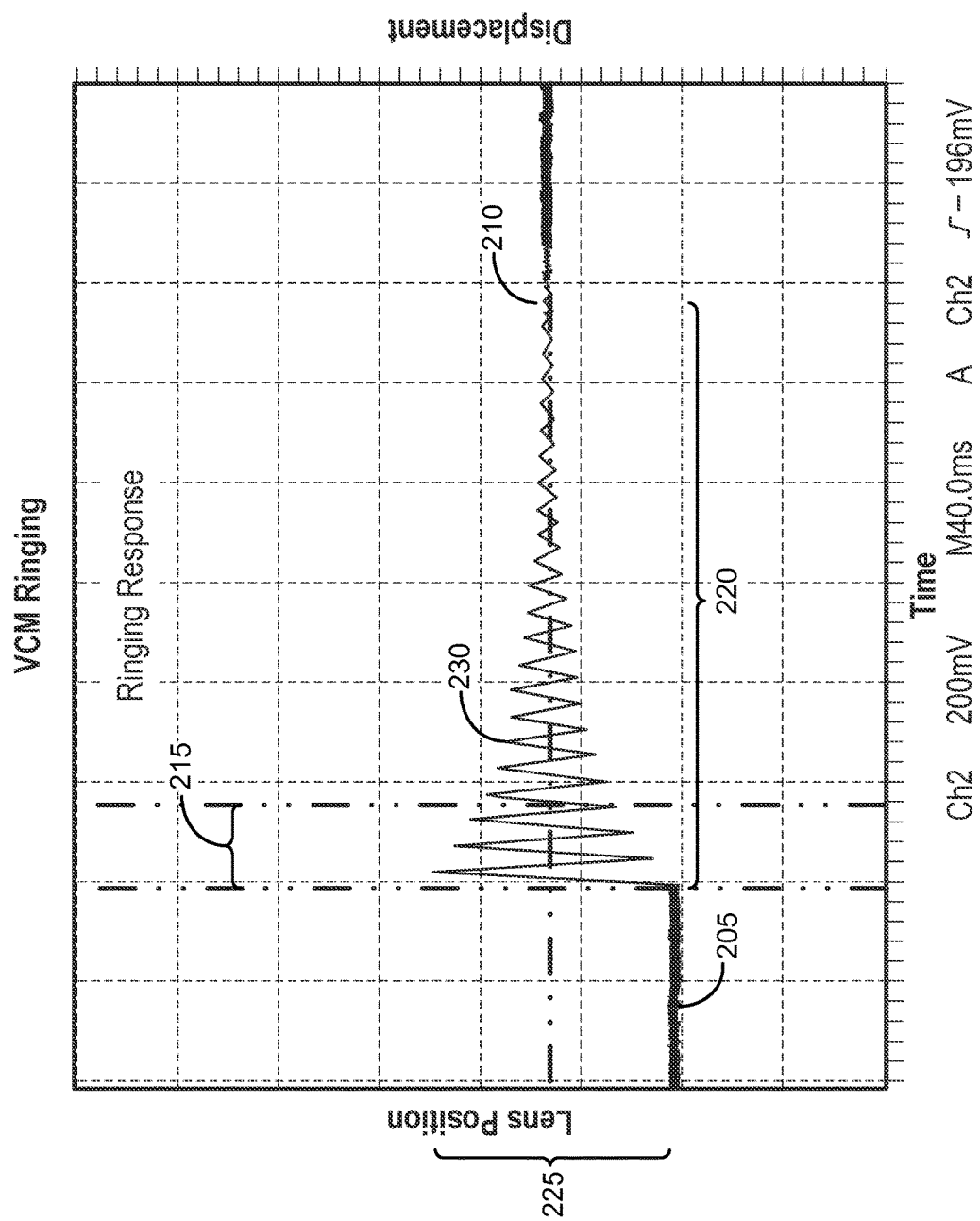
FIG. 2 illustrates the vibration of a lens in an imaging device during an autofocus search.

FIG. 2 is a graphical representation illustrating an example of vibrations of a lens, in an imaging device, and resulting from lens movements. The lens is moved from a first position (or displacement) 205 to a second position (or displacement) 210. The image sensor utilized with the illustrated lens may capture an image once per image frame time, illustrated by time period 215. Therefore, it may be desirable to capture an image at a frequency less than or equal to time period 215. When moving from the first position 205 to the second position 210, FIG. 2 shows an oscillation or lens vibration 225 in the displacement of the lens. FIG. 2 also shows a lens stabilization time 220. Vibrations introduced to the lens during movement may settle over a lens stabilization time (period) 220 such that the lens may be accurately (for example, to a certain threshold value) be used to capture an image subsequent to the lens stabilization period 220. Lens stabilization time 220 may be a function of the magnitude of oscillation or vibration 225. If the lens stabilization time 220 exceeds the frame time 215, the capture rate of the image sensor may be reduced to provide for lens stabilization. Solutions that can reduce lens stabilization time 220 may therefore reduce the time between when a lens is moved and when an image may be captured.

The vibration, illustrated in FIG. 2 may be generated in the actuator 114. An actuator 114, for example a VCM, may include components (for example, springs) that are made to move or vibrate, and such vibration may cause the ring or vibration shown in FIG. 2. Thus, as the lens 112 moves, vibration from the springs is imparted to the lens 112. The vibrations resulting from the movement of lens 112 by the actuator, may have an intrinsic ringing angular velocity ($\omega_0$). However, friction between the lens 112 and the lens casing (not shown) provide a damping mechanism for the vibration; and the small friction gradually reduces the vibration magnitude during the lens movement, as is shown by the decreasing amplitude of a vibration curve 230 in FIG. 2.

Accordingly, the ring (or vibration) curve 230 can be characterized by the following equation, in which displacement of the lens as a function of time, u(t), can be determined as:

$$u(t)=A\{1-e^{-\gamma t}\cos(Kt)\}, K=\sqrt{\omega_0^2-\gamma^2}$$

where A is the amplitude of the lens displacement 210, $\gamma$ is the damping ratio of the ring and is related to friction exerted on the lens during lens movement, and $\omega_0$ is the ringing angular velocity. The ringing angular velocity may be characterized as a function of the ring period T. In some embodiments, the ring period $T=2\pi/\omega_0$. The above equation may describe the ring and vibrations generated as a function of $\gamma$ and $\omega_0$. In some embodiments, lens actuator characteristics determination module 140 may be configured to determine the ringing angular velocity, damping ratio of ring period characteristics of the actuator 114 and/or sensor module 110. Lens actuator characteristics determination module 140 may include instructions to carry out calibration and evaluation of the sensor module 110 to determine the characteristics or the characteristics may be known and stored in memory 130 during manufacturing of the device.

Figure 3A:
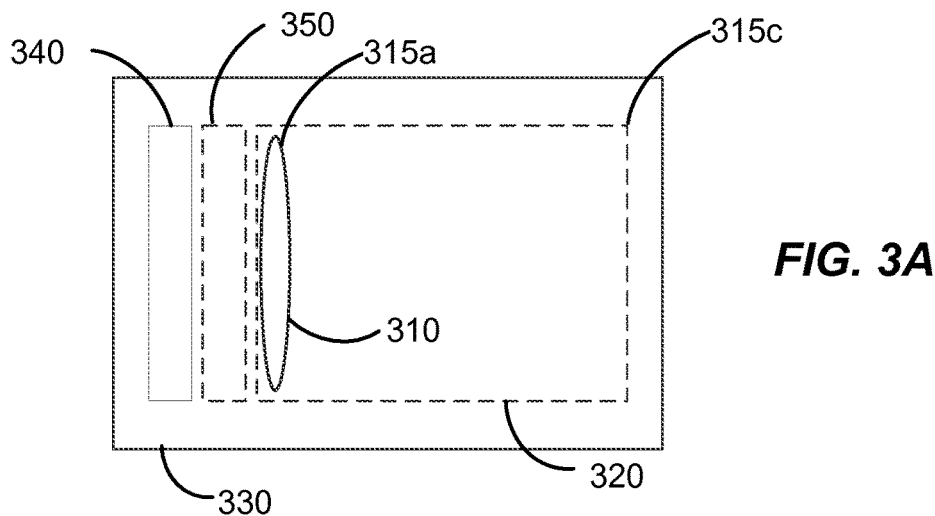
FIGS. 3A-3C are block diagrams of a sensor module implementing a lens ringing damping during an autofocus operation in accordance with one embodiment.
Figure 3B:
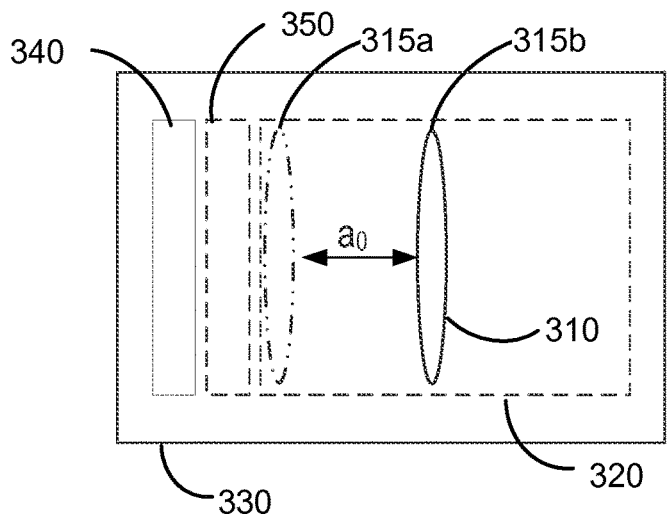
Figure 3C:
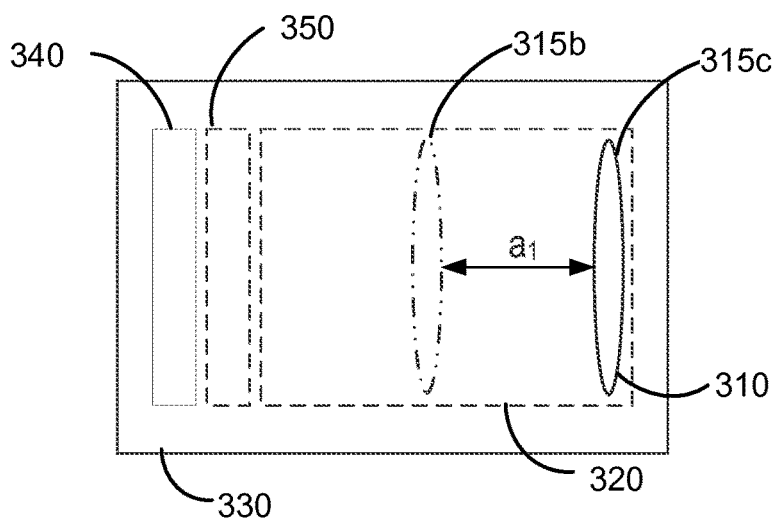

FIGS. 3A-3C are schematics illustrating diagrams of a sensor module implementing a two-step autofocus operation in accordance with one embodiment. FIG. 3A to 3C are block diagrams of sensor module 330 implementing lens movements as described herein. FIG. 3A illustrates an initial position 315a of a lens 310 and a target position 315c. FIG. 3B illustrates a first lens movement $a_0$ to move lens 310 to second position 315b. FIG. 3C illustrates a second lens movement of $a_1$ to move lens 310 to target position 315c.

The schematic illustrated in FIG. 3A shows is a block diagram of a sensor module 300 implementing one of the disclosed embodiments. Sensor module 300 may be implemented in accordance with sensor module 110 as detailed above in reference to FIG. 1. Sensor module 300 may include an autofocus component 320 and an image sensor 340. Mounting space 350 in the sensor module 300 be may be a cavity at least partially between the lens 310 and the image sensor 340. Image sensor 340 may be implemented in accordance with image sensor 116 as detailed above in reference to FIG. 1. Autofocus component 320 may include a lens 310 having an initial position 315a and a target position 315c. Target position 315c may be the target position for an autofocus operation in accordance with the disclosed embodiments. The sensor module 300 is configured such that lens 310 focuses light that enters the sensor module 300 is focused on the image sensor 340. The mounting space 350 is a region in the sensor module for mounting mechanics. For example, in some embodiments, mounting space 350 may hold brackets and other support for mounting the autofocus component. Mounting space 350 may provide area for brackets and other mounting means for mounting image sensor 340. Accordingly, the mounting space 350 may include one or more components to increase structural integrity of the autofocus component 320, lens 310 and image sensor 340 and be dimensioned (or configured) to allow an image to focus on image sensor 340 and maintain alignment along the optical axis of lens 340.

The lens 310 may be moved by autofocus component 320, which has a displacement range. The autofocus component may be an actuator in accordance with actuator 114 as described above in reference to FIG. 1. Autofocus component 320 may be configured to receive instructions from autofocus control module 135 and processor 105 to autofocus lens 310. In some embodiments, the instructions in autofocus control module 135 may send lens position information, along with other input parameters, to lens actuator characteristic determination module 140. The lens position information may include an initial lens position 315a and a target lens position 315c. In another embodiment, the autofocus control module 135 may send lens position information to damping parameters determination module 145. Therefore, instructions in autofocus control module 135 may be one means for generating input parameters defining a lens position in sensor module 300.

Instructions in lens actuator characteristics determination module 140 configure the processor 104 to determine actuation characteristics of lens 310. Lens actuator characteristics determination module 140 may include further instructions to transmit the actuator characteristics to damping parameters determination module 145. In some aspects, a movement position of the lens may include one or more positions corresponding to different actuation characteristics. For example, instructions from damping parameters determination module 145 can be included to break up or divide the lens movement to target position 315c into one or more smaller lens movements illustrated in FIG. 3A to 3C. The damping parameters determination module 145, based at least in part on actuation characteristics determined in the lens actuator characteristics determination module 140, may provide instructions as to divide the movement of lens 310 to target position 315c into a first lens movement $a_0$ to lens position 315b and a second lens movement $a_1$ to target lens position 315c.

FIGS. 4A-4D are examples of graphs illustrating a method for reducing lens ringing in accordance with one embodiment. Curve 410, of FIG. 4A, represents a simplified depiction of lens vibration or ringing as illustrated by lens vibration 230 as described in reference to FIG. 2. Curve 410 may be the result of moving a lens, in an imaging device, from an initial position to a target position 420. The imaging device may be substantially similar to the one described in FIG. 1 and/or FIG. 3. As described above in connection with FIG. 2, moving lens 310 directly from initial position 315a to target position 315c may result in vibrations characterized by the formula above:

$$u(t)=A\{1-e^{-\gamma t}\cos(Kt)\}, K=\sqrt{\omega_0^2-\gamma^2}$$

FIGS. 4B-4D are graphical illustrations depicting examples of reducing lens ringing in accordance with one embodiment. The ringing of curve 410 may be reduced or mitigated by dividing the movement of the lens 310 to target lens displacement or distance 420 into multiple smaller lens movements, for example, two steps represented by $a_0$ and $a_1$. In one implementation, an actuator of autofocus component 320 may have an angular velocity ($\omega_0$), a damping ratio ($\gamma$), and a ringing period of T. In one implementation, FIG. 4B may graphically represent the lens position as a function of time in accordance with the lens movements detailed in reference to FIGS. 3A-3C. The x-axis in FIGS. 4A-4D may represent the time for executing the autofocus operation. The y-axis in FIGS. 4A-4D may represent the lens position. The lens 310 may be located at initial position 315a. At time 450 ($t_0$), which may represent a time when the autofocus is initialized, the actuator may receive a command to move the lens to the second position 315b. The actuator may then move the lens by a first distance $a_0$. For example, referring to FIG. 1, an actuator 114 may receive a command issued from processor 105, being configured by one or more components of memory 130, to move the lens toward second position 315b, and after receiving the command actuator 114 may move the lens by a distance of $a_0$. At a time 460 ($t_1$), the actuator receives a command to move the lens to target position 315c. The actuator may then move the lens by a second lens displacement of $a_1$. The movement of distance $a_1$ may result in a subsequent lens vibration associated with the moving of the lens by the actuator. Target position 420 may be divided into two steps $a_0$ and $a_1$, as described above. In some embodiments, the steps $a_0$ and $a_1$ need not be equal in distance. In one embodiment, steps $a_0$ and $a_1$ can be calculated by the following formulae:

$$a_0 + a_1 = A \text{ and } \frac{a_0}{a_1} = e^{\pi\gamma/\omega_0}$$

FIG. 4C is a graph illustrating examples of the lens ringing curve for each lens movement of the two-step method in accordance with one embodiment. Curve 430 may represent the lens ringing due to vibrations and friction resulting from the actuator moving the lens from the initial position to the first lens position $a_0$. The characteristics of curve 430 may be similar to that of curve 420, however the distance of the lens movement is $a_0$ opposed to distance 420. Curve 430 may be characterized by the following damping equation:

$$u_0(t)=a_0\{1-e^{-\gamma t}\cos(Kt)\}, K=\sqrt{\omega_0^2-\gamma^2}$$

Curve 440 may represent lens ringing due to vibrations and friction resulting from the actuator moving the lens from first lens position $a_0$ to second lens position $a_1$. The characteristics of curve 440 may be similar to that of curve 430 and 420, however the distance of lens movement is $a_1$. By delaying the second lens movement for lens position $a_1$ from the first lens movement for initial lens position $a_0$ by, for example, time 460, the lens ringing may be reduced or mitigated. Time 460 may be determined by equation $t_1=\pi/\omega_0$. Curve 440 may be characterized by the following damping equation:

$$u_1(t)=a_1\{1-e^{-\gamma(t-t_1)}\cos(Kt-Kt_1)\}$$

FIG. 4D is a graph illustrating an example of mitigating lens ringing. Curve 430 and 440 may be combined in a way to substantially cancel the ringing or vibration of each other. The result is curve 470 which represents the lens movement from initial position, through the first and second lens movements, to target position 420 where lens ringing and vibrations have been reduced or removed. For example, the processor 105 may be configured to receive instructions from memory 130 to control the actuator 114 to move the lens 112 by the first lens displacement $a_0$, the first lens displacement causing a first ringing $u_0(t)$. The processor may be configured to receive instructions from memory 130 to control the actuator to move lens 112 by a second lens displacement $a_1$ causing a second ringing $u_1(t)$, the first ringing and second ringing substantially cancelling each other out. In some embodiments, the time to effectuate the multiple lens movements (e.g., two lens movements as shown in the embodiment depicted in FIGS. 4A-D) to move the lens to the target lens position (e.g., the configuration time) may equal the ring period. In instances where the configuration time does not substantially match the ring period, the resulting vibrations and lens ringing may be excessive. For example, where the configuration time is 50% greater than the ring period, the resulting ringing would be substantial and detrimental. However, the configuration time and ring period need not match the stabilization time, e.g., the amount of time for the lens vibration to settle. In one embodiment, for example FIGS. 4A-D, the lens can stabilize within approximately half of the ring period, e.g., at time 460, at which point the lens may be moved by a distance $a_1$. Thus, the stabilization time for the lens movement to position $a_0$ is less than the configuration time and ring period. In this way, the imaging device may be capable of capturing an image and/or initiate another lens movement at time 460. In another one embodiment, the smaller lens movements are completed within one image frame. For example, in an image capture device having a frame rate of 30 frames per second, any lens movements have to be finished within 33 milliseconds. In this way, the lens may be moved the complete distance to the target position within a single image frame with minimal ringing.

In another embodiment, autofocus component 320, via actuator 114, may be configured to move lens 310 from initial position 315a. The lens actuator characteristics module 140 may receive lens 310 position information, and determine lens actuator characteristics (e.g., $\omega_0$, $\gamma$, and T). The damping parameters determination module 145 may be configured to receive lens actuator characteristics from lens actuator characteristics determination 140, and determine damping parameters including at least a first ($a_0$) and second ($a_1$) lens movements and a time delay ($t_1$). First lens movement $a_0$ represents the lens movement to position 315b, the first lens movement causing the first lens ringing curve 430 characterized by $u_0(t)$. The vibration of curve 430 may continue until the vibration settles as shown in FIG. 4C.

Following lens movement to position 315b, the autofocus control module 135 may insert time delay $t_1$. Delay $t_1$ may be determined by damping parameters determination module 145 based at least on actuator characteristics determined, for example angular velocity $\omega_0$ and damping ratio $\gamma$. Lens ringing represented by curve 430 may persist while the autofocus component 320 delays by time $t_1$.

After an amount of time equal to delay $t_1$ passes, autofocus control module 135 may be configured to cause actuator 114 to move lens 310 from position 315b to target position 315c by distance $a_1$. The distance $a_1$ may be determined prior to the first lens movement and stored in memory 130 or distance $a_1$ may be determined at a point after movement $a_0$. Movement of lens 310 to target position 315c causes ringing defined by curve 440 characterized by $u_1(t)$. The vibration of curve 440 may continue until the vibration settles. Curve 430 and 440 may be combined upon completion of each of the smaller lens movement to target position 315c. The damping parameters (e.g., lens positions $a_0$ and $a_1$ and delay $t_1$), determined by damping parameters determination module 145, may be applied to the lens 112 such that the peak of curve 440 matches and cancels the trough of curve 430, as seen in FIG. 4C. In this way, curves 430 and 440 substantially cancel the ringing or vibration of each other out to mitigate the lens ringing of FIG. 4A.

The resultant two-step actuator damping settles within a single ringing period with minimal ringing after the first ring period. In an exemplary embodiment, the damping settles near half the ringing period. The delay to cancel the ringing approach is used in other embodiments described herein. One non-limiting advantage of a two-step damping solution is that only two steps are required. This may be referred to as a sweet spot damping with fast damping with minimal ringing after a single ring period once the lens is in position. Another non-limiting advantage is that other methods may require a near ring period (T) lens configuration time to move the lens to the target position which includes the time for the vibrations to settle, while lens movement time for the two-step method disclosed herein is T/2. This may be advantage, especially for large ring periods, since use of a full ring period for lens configuration may require skipping at least one frame until the next lens movement, for a typical 33 ms frame time of a 30 fps (frame per second) camera preview streaming. An autofocus calculation for every frame is possible if T is less than 16 ms (62.5 Hz ringing) for two-step damping. Actuator or lens ringing typically ranges from 50 Hz to 150 Hz, with 100 Hz a common frequency.

Other embodiments can have more than two steps. Examples with 3 or 4 steps are described herein in reference to FIGS. 8-12, but the number of steps may be increased depending on the application (for example 5, 6, 7, 8, 16, or 32 steps). Embodiments with steps greater than four may be performed by use of a combination of the two-, three-, or four-step embodiments disclosed herein (e.g., five steps can be performed by a combination of the two-step and three-step embodiments).

In some embodiments, a constant lens movement distance may be used for each step. These embodiments may be easier to implement because the actuator's input and output may not be linear over different displacement ranges, in which case constant step sizes may be easier to implement. For example, a processor may communicate one distance value to an actuator, however that value may actually refer to a different lens movement distances by the actuator based on the current lens position. A distance value of 10 communicated to the actuator may result in a lens moving to a 20 µm position from a 30 µm position, but the same value may end up moving the lens only 18 µm from a 50 µm position. In this way, the actuator may have a non-linear input-output response. To compensate for the non-linearity within an actuator, the system may include a lookup table to convert a provided distance value to a known value for the actuator to move lens the intended distance. By using constant lens movement distances for each step, implementation and use of such look up table may be simplified.

Figure 5A:
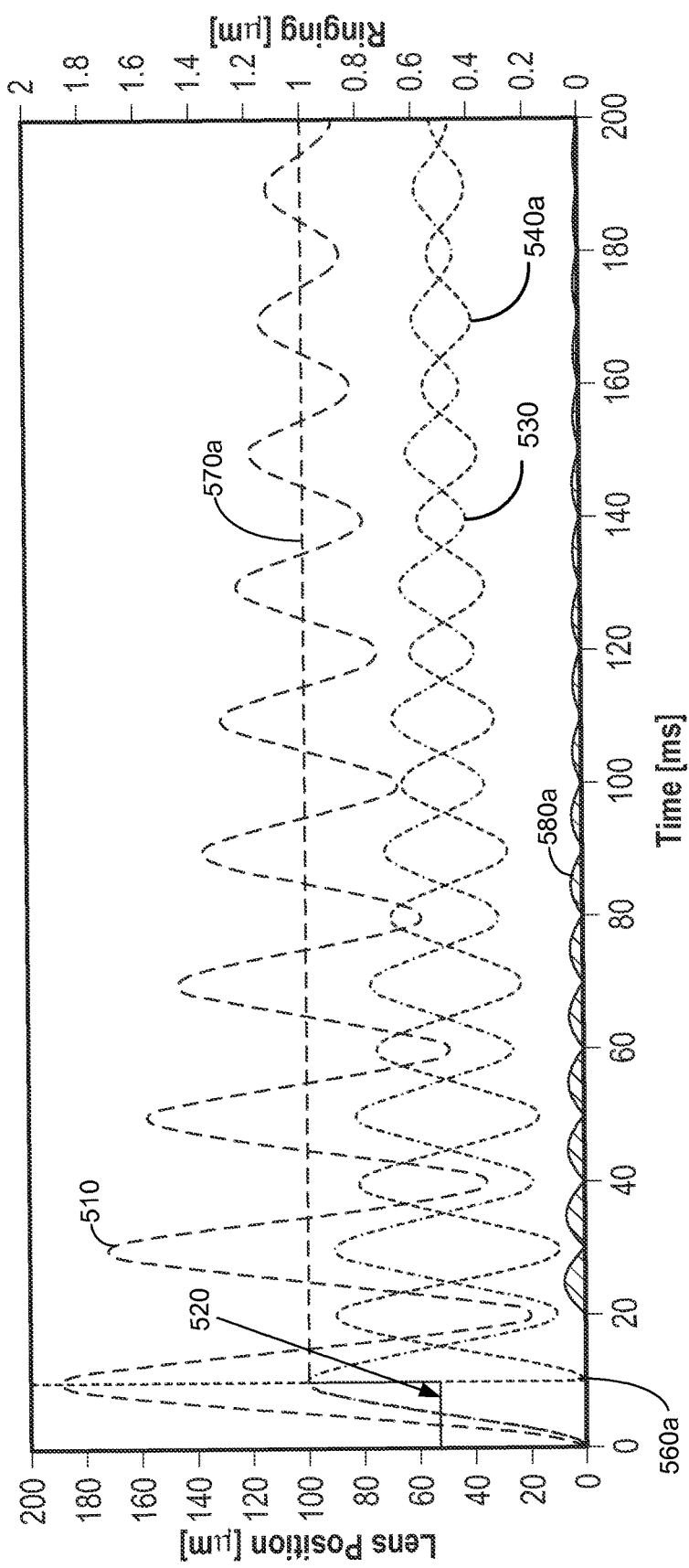
FIG. 5A illustrates the vibration of a lens and damping of the vibrations of a lens in accordance with one embodiment.
Figure 5B:
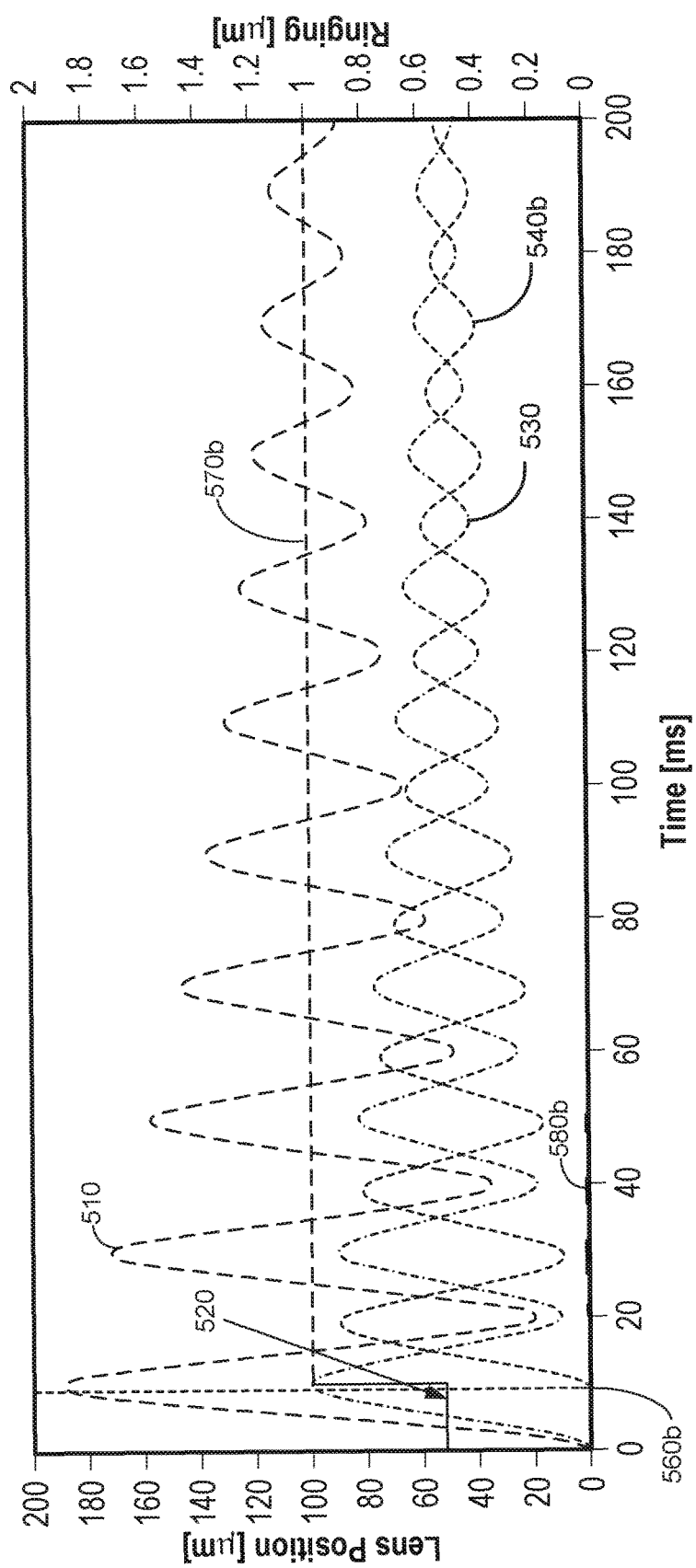
FIG. 5B illustrates the vibration of a lens and optimal damping of the vibrations of a lens in accordance with one embodiment.

FIGS. 5A and 5B illustrate graphs of displacement versus time to explain the differences in damping of the ring between un-optimized and optimized delay times. Each of FIGS. 5A and 5B depict lens ringing curve 510 where damping of the lens ringing has not occurred. Curve 510 may be substantially similar to curve 410 and/or the curve of FIG. 2. Each of FIGS. 5A and 5B further include curve 530 which may be substantially similar to curve 430 of FIG. 4C. Curve 530 may be the resulting ringing due to lens movement from initial position to first lens position by a distance $a_0$. In each of FIGS. 5A and 5B, the lens ringing u(t) is generated where the damping a damping coefficient $\gamma=0.035\omega_0$, the ring period is 20 milliseconds, and $T=2\pi/\omega_0$. Thus both FIGS. 5A and 5B illustrate a two-step damping as discussed in reference to FIG. 4 over 20 ms.

FIG. 5A illustrates graphs where the time delay $t_1$ is equal to $\pi/\omega_0$. Curve 510 shows a lens ringing without software damping, as mentioned above. Curve 520 shows the lens steps, where a first lens steps is a result of a command issued at time $t_0$ and the second lens step occurs as a result of a command to move the lens issued at time 560a. Curve 530 shows the lens ringing in response to a first lens movement. Curve 540a shows the lens ringing in responses to a second lens movement, being delayed by time 560a equal to delay $t_1$. Curve 570a illustrates the resulting combination of curves 530 and 540a after software damping. As seen in FIG. 5A, some ringing persists as represented by curve 580a. The amount of remaining ringing may vary based on the lens actuator characteristics. For example, in the embodiment where $\gamma=0.035\omega_0$ and $t_1=\pi/\omega_0$, the lens ringing is approximately 0.1 µm. In another embodiment, where $\gamma=0.100\omega_0$ and $t_1=\pi/\omega_0$, the lens ringing is approximately 0.6 µm. In yet another embodiment, where $\gamma=0.200\omega_0$ and $t_1=\pi/\omega_0$, the lens ringing is approximately 1.6 µm.

FIG. 5B illustrates graphs where delay $t_1$ is optimized for mitigating vibrations imparted into the lens resulting in ringing. FIG. 5B is substantially similar to FIG. 5A, however the time 560a is optimized by adding a lag to $t_1$, shown as total delay 560b. Due to added lag to the delay 560a, the second lens movement causes second ringing curve 540b. In the embodiment shown in FIG. 5B, the lag is a negative lag being added to time 560a by subtractive means. However, in other embodiments, the lag may be positive and may be determined to minimize the ringing imparted onto the lens. Curve 540b and 530 may be combined to reduce lens ringing, resulting in curve 570b. Curve 580b illustrates the remaining lens ringing after two-step damping. As shown in FIG. 5B, the lag added to delay 560a (resulting in delay 560b) further mitigated the lens ringing as compared to FIG. 5A, where the time delay 560a is un-optimized. For example, a two-step damping solution for $\gamma=0.035\omega_0$ may have an optimized delay 560b where $t_1=\pi/\omega_0+6.1$ µs that results in nearly zero ringing.

Figure 6:
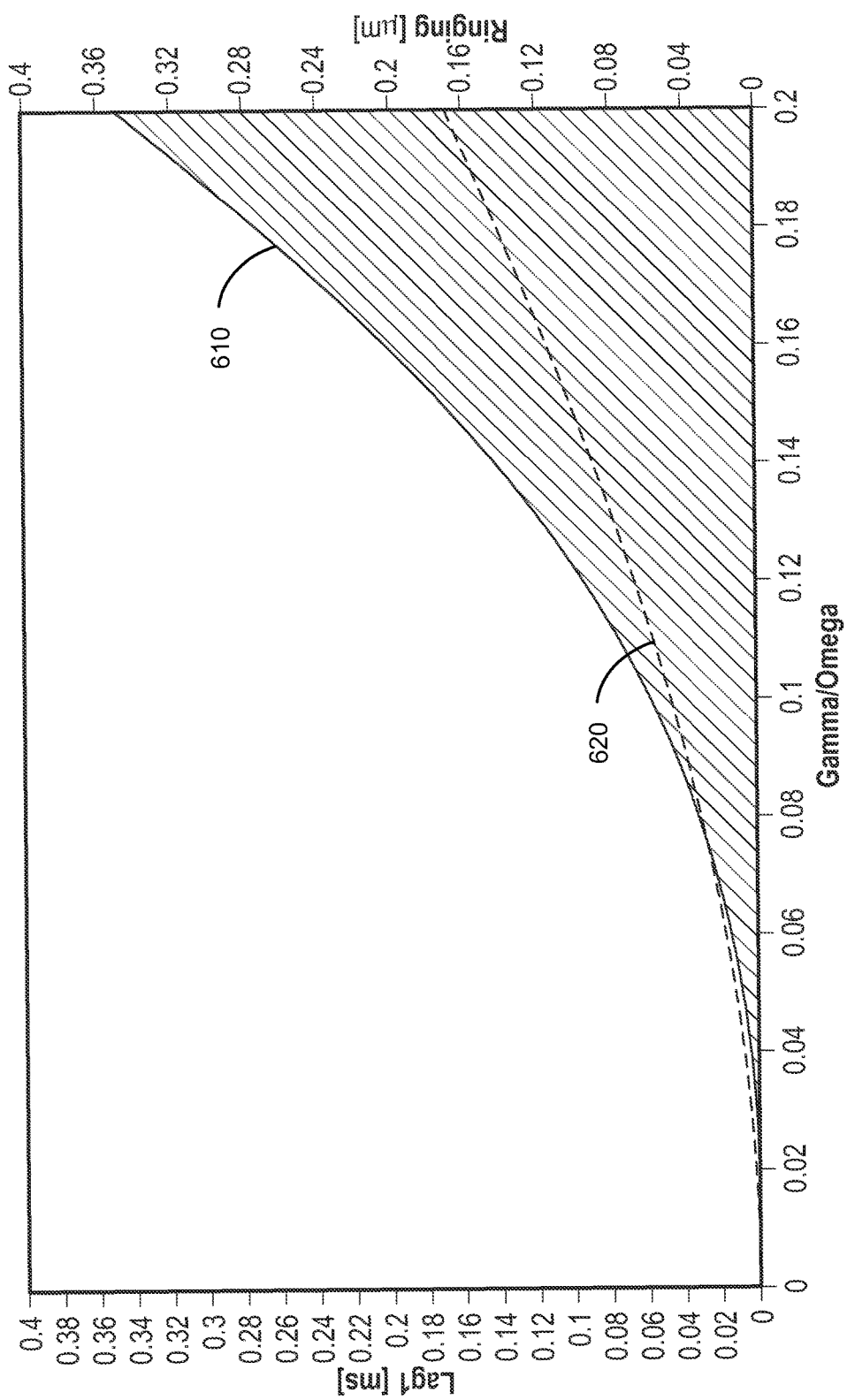
FIG. 6 illustrates time lag as a function of damping ratio in accordance with one embodiment.

FIG. 6 is a graph showing the lag as a function of damping ratio in accordance with one embodiment. FIG. 6 illustrates an optimal lag to minimize lens ringing may be determined as a function of the angular velocity ($\omega_0$) and damping ratio ($\gamma$) for a two-step damping solution. Thus, in one embodiment, the delay, having a time delay and a lag, may be based on at least one characteristic of the actuator and the number of steps for a given solution. Curve 610 represents the lens ringing experienced by the lens after software damping with lag added to the time delay. Curve 620 represents the amount of lag to add to delay 560a to optimally reduce or mitigate lens vibrations and ringing. In the embodiment of FIG. 6, the ring period is 20 ms whereby $\omega_0$ may be calculated as detailed above. For example, where $\gamma/\omega_0$ is equal to 0.035, the optimal time delay is 6.1 µs as discussed above. Further, where $\gamma/\omega_0$ is equal to 0.100, the optimal time delay is 50 µs, such that $t_1=\pi/\omega_0+50$ µs. In another embodiment, where $\gamma/\omega_0$ is equal to 0.200, the optimal time delay is 166 µs, such that $t_1=\pi/\omega_0+166$ µs. However, as will be discussed below in connection with FIGS. 10 and 12, other optimal lag curves may be calculated for different ring periods. In some embodiments, the ring period and/or damping ratio may be characteristics of the actuator. Thus, the characteristics may be determined by the lens actuator characteristics module 140. In another embodiment, the actuator characteristics may be set to a default within the lens actuator characteristics determination module 145. The damping parameters, e.g., the lens displacements distances and delay, may, in turn, be determined by the damping parameters determination module 145 based at least in part on the lens actuator characteristics as determined by the lens actuator determination module 145.

FIG. 7 is a flowchart of a method for reducing lens vibration imparted to a lens during lens movement in accordance with one embodiment. Process 700 may be performed by imaging device 100, illustrated in FIG. 1. In some embodiments, the method of reducing lens vibrations may be performed for each lens movement requirement received from the autofocus control module 135. The method can be implemented as a software solution by the autofocus control module 135 or implemented elsewhere in the imaging device 100, for example one or more processors executed by logic device in processor 105.

Process 700 begins at start block 705 and then moves to block 710, where input parameters defining a target lens position are received. In some embodiments, a target lens position may be determined by instructions included in the focus control module 135 related to an autofocus movement of the lens. The target lens position may then be received by the damping parameters module 145.

Process 700 may continue to block 720, where the total lens displacement to move the lens to the target position is determined. In some embodiments, the total lens displacement may be based on the current lens position and the received target lens position. The autofocus control module 135 may determine the target lens position at block 710, and the memory 130, via the lens movement control module 155, may store the current position of the lens. Instructions included in the autofocus control module 135 may determine the total displacement based on the determinations of autofocus control module 135 and lens movement control module 155. In some embodiments, the total lens displacement is determined for a single frame in the autofocus operation.

Process 700 may then proceed to block 725, where the total lens displacement is broken up or divided into several smaller lens displacements or lens movements. In some embodiments, the number of smaller lens movements may be determined by instructions included in the damping parameters determination module 145. The number of smaller movements may represent a two-step damping model, as described in reference to FIGS. 3-6. Other embodiments may have more than two steps. As noted above, examples with 3 or 4 steps are described herein in reference to FIGS. 8-12. In some embodiments, the step sizes for each step may be constant, for example total displacement (A) equals smaller displacement (a) divided by the number of smaller steps (N). Other embodiments, may use step sizes for each step that are not constant.

Process 700 may then set a counter to one at block 730. In some embodiments, the counter may be implemented to keep track of the smaller lens movements by incrementing the counter after each of the smaller lens movements. In some embodiments, the lens movement control module may include instructions to keep track of the number of smaller lens movements by incrementing the counter. The number of smaller lens movements may be received from damping parameters determination module 145 as a result of block 725.

The process 700 then proceeds to block 735, where the lens is moved to the next smaller lens position. In some embodiments, the actuator, e.g., a VCM, may receive instructions from the autofocus control module 135 and/or the lens movement control module 155 to move the lens to a next lens position. The next lens position may be at least one of the smaller lens positions resulting from block 725. After the lens is moved into the position, process 700 continues to decision block 740 to determine whether the process has moved the lens through all N smaller lens movements. In this respect, process 700 may utilize the counter of block 730 by incrementing the counter to keep track of each of the smaller movements. If the counter is equal to N, then decision block 740 determines the lens has moved through all N smaller movements and the lens has reached the target position. In this situation, the process 700 may continue to block 760 where the lens movement and reduction of ringing is completed. If the counter is less than N, then decision block 740 continues to block 745. In some embodiments, instructions included in lens movement control module 155 may determine that the current lens position is not equal to the total smaller lens movement. In another embodiment, the determination instructions may be included in the autofocus control module 135. In yet, another embodiment, the instructions may be included elsewhere in the imaging device, e.g., at least one software process executed by a logic device.

The process 700 continues to block 750, where a time delay may be inserted prior to the next lens movement. The next lens movement may be at least one of the N smaller lens movements. In some embodiments, the time delay may be determined by instructions included in damping parameters determination module 145. In another embodiment, the time delay may be determined in accordance with the methods described herein, for example, in reference to FIGS. 3-6 related to the two-step lens ringing damping solution. In another embodiment, the time delay may include an optimized delay having a time delay and lag. In yet another embodiment, the time delay may be determined in accordance with the methods described below in reference to FIGS. 8-12 related to a three- or four-step solution. One implementation of the time delay utilizes a constant time delay between each of the smaller lens movements, where the delay may be equal to $\pi/\omega_0$. In another implementation, the time delay for each smaller lens movement may be optimized to mitigate lens ringing, in accordance with FIGS. 6, 10 and 12. Damping parameters determination module 145 may include instructions to determine the time delay, optimized or not, and operate in conjunction with autofocus control module 135 and/or lens movement control module 155 to insert the delay between each lens movement.

Process 700 may then continue to block 755, where the counter may be increased by an increment. In some embodiments, the increase may be an integer, e.g., 1, representing at least one of the smaller lens movements. In this way the method may increment the counter to keep track of the lens movements and corresponding time delays. Once the counter has been incremented, the process may proceed to block 735 and repeat the process for moving the lens through each of the smaller lens movements until the counter value equals N (the number of determined smaller lens movements). Once all N smaller lens movements are completed the process 700 may proceed to end block 760 and the autofocus operation may be completed.

Figure 8A:
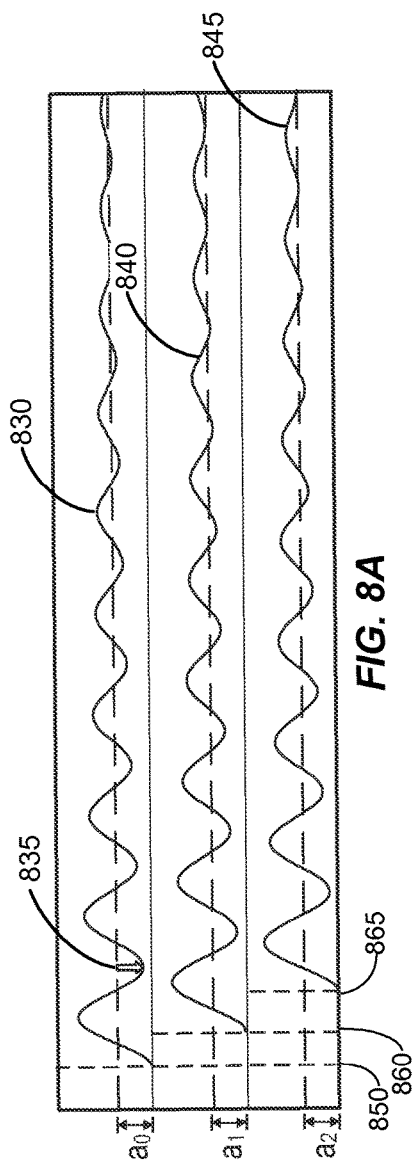
FIGS. 8A-8C illustrate reducing lens vibration imparted to a lens during lens movement in accordance with one embodiment.
Figure 8B:
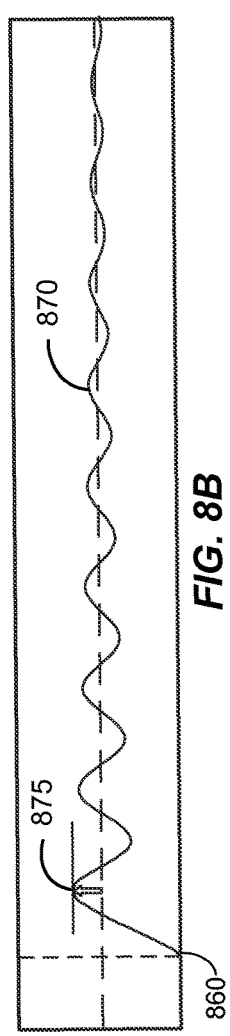
Figure 8C:
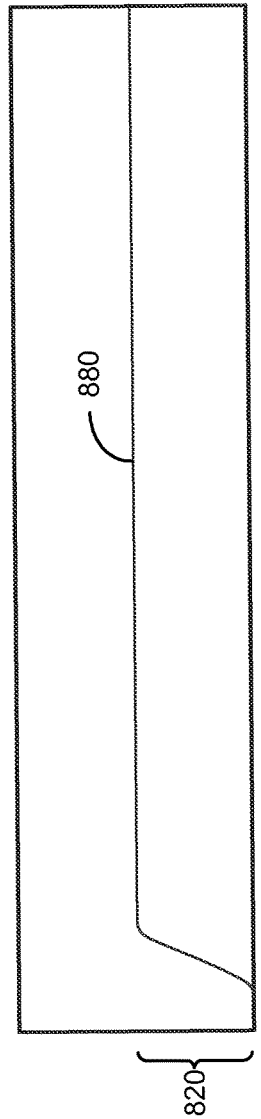

FIGS. 8A-8C are graphs illustrating a three-step method for reducing lens ringing in accordance with one embodiment. FIGS. 8A and 8C are similar to FIGS. 4C and 4D, related to a two-step solution, but illustrate a three-step solution embodiment. In one implementation, FIGS. 8A-8C may graphically represent the lens position as a function of time in accordance with the lens movements. The x-axis of FIGS. 8A-8C represents the time for executing the autofocus operation, and the y-axis of FIGS. 8A-8C represents the actual lens position at a given time. The imaging device used to implement the three-step embodiment may be substantially similar to the one described in FIG. 1. As described above in connection with FIG. 2, moving a lens directly from an initial position to target position 820 may result in vibrations characterized by the formula above:

$$u(t)=A\{1-e^{-\gamma t}\cos(Kt)\},\ K=\sqrt{\omega_0^2-\gamma^2}$$

The lens ringing may be reduced or mitigated by dividing the movement of the lens to target displacement or distance 820 into three smaller lens movements or steps $a_0$, $a_1$, and $a_2$. In some embodiments, steps $a_0$, $a_1$, and $a_2$ may be three equal steps, such that $a=A/3$ where A is the total target displacement 820. In one implementation, an actuator of autofocus component 320 may have an angular velocity ($\omega_0$), a damping ratio ($\gamma$), and a ringing period of T.

Referring to FIG. 8A, the lens may be located at an initial position at time $t_0$ indicated as time 850. At time 850, the lens may be moved to first position by a distance of $a_0$. Movement of the lens to the first position may result in a first ringing 830 ($u_0(t)$). At a time 860 ($t_1$), the lens may be moved to second position by a distance of $a_1$. Movement of the lens to the second position may result in a second ringing 840 ($u_1(t)$). At a time 865 ($t_2$), the lens may be moved to the target position 820 by a distance of $a_2$. Movement of the lens to the target position may result in a third ringing 835 ($u_2(t)$).

Curve 870 of FIG. 8B represents the resulting combination of lens ringing due to lens movements to the second and target positions. Curve 870 illustrates the combined lens ringing $u_{12}(t)$, where $u_{12}(t)=u_1(t)+u_2(t)$. The time delays 860 and 865 are introduced such that curves 830, 840, and 845 substantially cancel out the lens vibrations and/or ringing. For this result to occur, the damping parameter determination module 145 may include instructions to determine time delays 860 and 865 such that the conditions to the first peak 875 of curve 870 coincides with the second peak 835 of curve 830. The resulting combination of curve 870 and curve 830 are such that the amplitudes of the peaks are the same size and of opposite polarity and phase, thereby substantially canceling out the ringing or vibration of each other.

Curve 880 of FIG. 8C is the result once curves 830, 840 and 845 combine to cancel, or substantially cancel, the ringing or vibration of that each curve 830, 840, and 845 represents. Curve 880 represents the lens movement from initial position, through the first, second, and third lens movements, to target position 820 where lens ringing and vibrations have been reduced or removed. For example, the processor 105 may be configured to receive instructions from memory 130 to control the actuator 114 to move the lens 112 by the first lens displacement $a_0$, the first lens displacement causing a first ringing $u_0(t)$. The processor may be configured to receive instructions from memory 130 to control the actuator 114 to move lens 112 by a second lens displacement $a_1$ causing a second ringing $u_1(t)$. The processor may be configured to receive instructions from memory 130 to control the actuator 114 to move lens 112 by a third lens displacement $a_2$ causing a third ringing $u_2(t)$, the second and third ringing combine such that the resulting curve's peak amplitude is the same size but opposite polarity of the trough of the curve due to the first ringing thereby substantially cancelling each other out. In some embodiments, the time to effectuate the three lens movements to move the lens to the target lens position (e.g., the configuration time) may equal the ring period. In instances where the configuration time does not substantially match the ring period, the resulting vibrations and lens ringing may be excessive. In another embodiment, the smaller lens movements are completed within one image frame. For example, in an image capture device having a frame rate of 30 frames per second, any lens movements have to be finished within 33 milliseconds. In this way, the lens may be moved the complete distance to the target position within a single image frame with minimal ringing.

In another embodiment, an autofocus component, via actuator 114, may be configured to move the lens from an initial position. The lens actuator characteristics module 140 may receive lens position information, and determine lens actuator characteristics (e.g., $\omega_0$, $\gamma$, and T). The damping parameters determination module 145 may be configured to receive lens actuator characteristics from lens actuator characteristics determination 140, and determine damping parameters including at least a first ($a_0$), second ($a_1$), and third ($a_2$) lens movements and a time delays 860 ($t_1$) and 865 ($t_2$). First lens movement $a_0$ represents the lens movement to the first lens position, the first lens movement causing the first lens ringing curve 830 characterized by $u_0(t)$. The vibration of curve 830 may continue until the vibration settles as shown in FIG. 8A.

Following lens movement to first lens position, the autofocus control module 135 may then insert time delay 860. Delay 860 may be determined by damping parameters determination module 145 based at least on actuator characteristics determined, for example angular velocity $\omega_0$ and/or damping ratio $\gamma$. Lens ringing represented by curve 830 may persist while the autofocus component delays by time 860.

After an amount of time equal to delay 860 passes, autofocus control module 135 may be configured to cause actuator 114 to move lens 310 from first lens position to the second lens position by distance $a_1$, the second lens movement causing the second lens ringing curve 840 characterized by $u_1(t)$. The vibration of curve 840 may continue until the vibration settles as shown in FIG. 8A.

Following lens movement to second lens position, the autofocus control module 135 may then insert time delay 865. Delay 865 may be determined by damping parameters determination module 145 based at least on actuator characteristics determined, for example angular velocity $\omega_0$ and/or damping ratio $\gamma$. Lens ringing represented by curve 840 may persist while the autofocus component delays by time 865.

After an amount of time equal to delay 865 passes, autofocus control module 135 may be configured to cause actuator 114 to move the lens from the second lens position to the target position by distance $a_2$. The distances $a_1$ to $a_2$ and time delays 860 and 865 may be determined prior to the first lens movement and stored in memory 130 or determined at a point after movement by $a_0$. Movement of the lens to the target position causes ringing defined by curve 845 characterized by $u_2(t)$. The vibration of curve 845 may continue until the vibration settles. Curves 830, 840 and 845 may be combined upon completion of each of the smaller lens movement as the lens continues to experience the ringing due to the corresponding lens movement. The damping parameters (e.g., lens positions $a_0$, $a_1$, and $a_2$ and corresponding time delays 850, 860, and 865), determined by damping parameters determination module 145, may be applied to the lens such that the condition results whereby the first peak 875 of curve 870 ($u_{12}(t)$) coincides with the trough 835 of curve 830 ($u_0(t)$). The resulting combination of curve 870 ($u_{12}(t)$) and curve 830 ($u_0(t)$) are such that the amplitudes of the peaks are the same size and of opposite polarity, thereby substantially canceling out the ringing or vibration of each other.

The resultant three-step actuator damping settles within a single ringing period with minimal ringing after the first ring period. One non-limiting advantage of a three step damping solutions is that only three steps are required, thereby minimizing the need to initiate the actuator numerous times in a single frame. Another non-limiting advantage of the three-step embodiment, and four-step embodiment described below, is that a zero ringing solution, or complete canceling of lens vibration, may be achieved, while the two-step embodiment may result in a minimized, but non-zero, vibration. However, the two-step embodiment may be quicker and more stable to implement, due to fewer lens movements required to implement. Another non-limiting advantage is that prior methods require a near ring period lens configuration (settling) time to move the lens to the target position, while lens configuration time for a three step method, described herein reference to FIGS. 8A-8C, is 2*T/3. This may be significant advantage over methods using more than three lens steps, especially for large ring periods, because use of a full ring period for a lens movement may require skipping at least one frame until the next lens movement, for a typical 33 ms frame time of a 30 fps (frame per second) camera preview streaming. In some embodiments, the lens configuration time may be a function of the number of lens steps, such that the lens configuration time may be equal to the ring period multiplied by to the number of steps minus one over the number of steps (e.g., (N–1)/N*T, where N is the number of steps). Thus, for a two-step method the settling time approximately 0.5T, for a three-step method the settling time approximately 0.67T, for a four-step method the settling time approximately 0.75T, etc. An autofocus calculation for every frame is possible if the ring period is less 12 ms (83.3 Hz ringing) for 3-step damping. Actuator or lens ringing typically ranges from 50 Hz to 150 Hz, with 100 Hz a common frequency. A further advantage of the four-step embodiment may be to compensate for the non-linearity of the actuator during a large target lens movement when an actuator input-output look up table is not available. By using smaller but more numerous lens movements, the system may be able to compensate for a lack of a look-up table.

FIG. 9A is a diagram that illustrates the three-step method in accordance with one embodiment. The diagram shows three lens movements plotted against an increase in time t. The three step sizes may be constant and equal, where $$a = \frac{A}{3},$$

where the total lens displacement 910 is equal to a target position A. Initial time 940 represents a moment when the lens is moved from its initial position to a first position by distance $a_0$. Second time 950a represents a moment in time when the lens is moved from the first position to a second position by a distance of $a_1$. Third time 960a represents a moment in time when the lens is moved from the second position to a third position by a distance of $a_2$. In the embodiment of FIG. 9A, the time separating each movement, e.g., 950a and 960a, may be constant time delays, thus $t_N = T/N$ (e.g., $t_{950a} = T/3$ and $t_{960a} = 2*T/3$). Thus, the amount of time delayed between each movement is the same and may be a function of the ringing period.

FIG. 9B is a diagram that illustrates the three-step method having optimized delays with time lags in accordance with one embodiment. FIG. 9B is similar to FIG. 9A, where distances $a_0$, $a_1$, $a_2$, and 910 may be similar to those described in reference to FIG. 9A. Further, time delays 940, 950a, and 960a represents similar times as discussed in FIG. 9A. However, the lens movements of FIG. 9B each include a corresponding lag added to or subtracted from the time delay. Lens movement from first position to second position by distance $a_1$ may include a lag 955 from time delay 950a, such that an optimized time delay 950b may improve ringing mitigation, as discussed in reference to FIG. 5A-5B related to the two step method. Similarly, lens movement from second position to target position by distance $a_2$ may include lag 965 from time delay 960a, such that an optimized time delay 960b improve ringing mitigation. In the embodiment shown in FIG. 9B, the delays include negative time lags (e.g., the delay is shortened for a shorter delay) such that the lens ringing associated with each delay (e.g., $u_0(t)$, $u_1(t)$, and $u_2(t)$) effectively cancel the ringing. However, it will be understood that the optimized time lags need not be negative, and may be positive delays (e.g., lengthening the respective time delay for each movement). The dampening parameters, including the timing delay and associated optimized lag, may be determined by the damping parameters determination module 145 and may be determined to effectively minimize the ringing of the lens while moving the target position.

Figure 10:
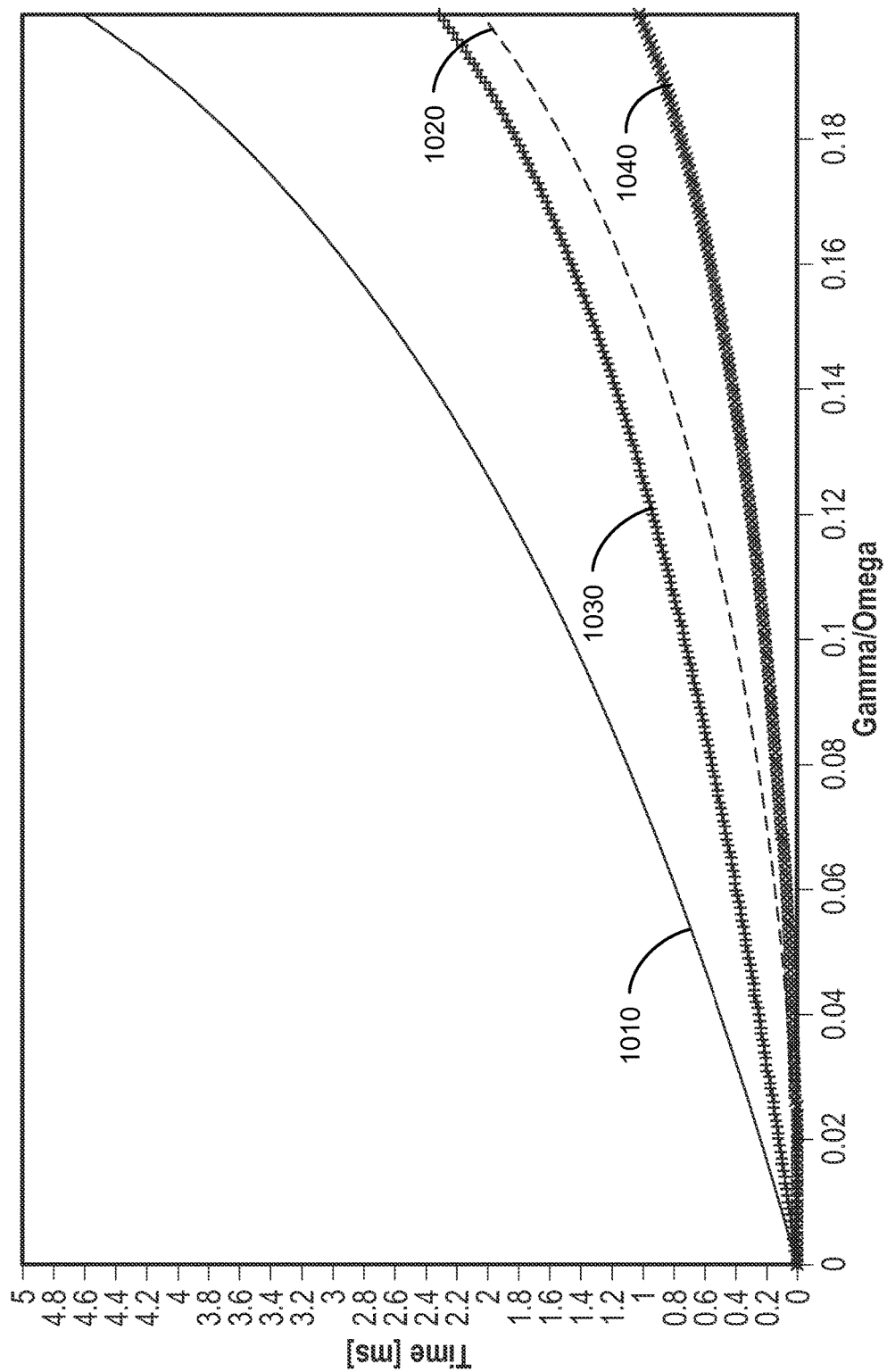
FIG. 10 illustrates time lag as a function of damping ratio in accordance with one embodiment.

FIG. 10 is a graph showing the optimal lag as a function of damping ratio in accordance with the three step damping embodiment. FIG. 10 illustrates optimal negative lags to minimize lens ringing may be determined as a function of the angular velocity ($\omega_0$) and damping ratio ($\gamma$) for a three-step damping solution. Curve 1010 represents the amount of lag added to time delay 950a to reduce or mitigate lens vibrations and ringing. By subtracting lag 955 from delay 950a as determined in FIG. 10, the optimal delay is shown by 950b. Curve 1020 represents the amount of lag to apply to time delay 960a to reduce or mitigate lens vibrations and ringing. By subtracting lag 965 from time delay 960a as determined in FIG. 10, the optimal time delay is shown by 960b. The embodiment shown in curves 1010 and 1020 represents a ring period of 20 ms. In some embodiments, the ring period and/or damping ratio may be characteristics of the actuator. Thus, the characteristics may be determined by the lens actuator characteristics module 140. In another embodiment, the actuator characteristics may be set to a default within the lens actuator characteristics determination module 145. The damping parameters, e.g., the lens displacements distances and time delay, may, in turn, be determined by the damping parameters determination module 145 based at least in part on the lens actuator characteristics as determined by the lens actuator determination module 140.

Further, FIG. 10 also depicts that the lag curves to determine lags 955 and 965 are a function of the damping ratio at various ring periods of the three-step damping solution. Having determined the curves 1010 and 1020 through experimentation, the curves for any ring period may be calculated. For example, curves 1030 and 1040 represent optimal lag times to subtract from time delay 950a and 960a, respectively, where the ring period of the given actuator is 10 ms. To calculate the optimal lags for a ring period of 10 ms, one skilled in the art may use a previously determined lag curve (e.g., a lag curve related to a ring period of 20 ms). As such, the following equation is applicable:

$$Lag_{10} = Lag_{20} * T_{10} \div T_{20}$$

Where $Lag_{10}$ is the optimized lag for a ring period of 10 ms, $Lag_{20}$ is the optimized lag for a ring period of 20 ms, $T_{10}$ is the ring period of the sought lag curve (e.g., 10 ms), and $T_{20}$ is the ring period of the known curve. By this ratio, curve 1030 may be calculated by multiplying curve 1010 by ratio of the ring periods of curve 1030 and curve 1010. Also, curve 1040 may be calculated by multiplying curve 1020 by the ratio of the ring periods of curve 1040 and curve 1020. Thus, where a lag curve is known for a given ring period the lag curve corresponding to a different ring period may be calculated based on the known curve, the known ring period and the sought after ring period lag curve.

FIG. 11A is a diagram that illustrates the four-step method in accordance with one embodiment. The diagram shows four lens movement plotted against an increase in time. The following approach seeks to minimize ringing without increasing the number of steps, or varying the VCM input (step size) in every step. The four step sizes may be constant and equal, where $$a = \frac{A}{4},$$

where the total lens displacement 1110 is equal to a target position A. Initial time 1140 represents a moment when the lens is moved from its initial position to a first position by distance $a_0$. Second time 1150a represents a moment in time when the lens is moved from the first position to a second position by a distance of $a_1$. Third time 1160a represents a moment in time when the lens is moved from the second position to a third position by a distance of $a_2$. Fourth time 1170a represents a moment in time when the lens is moved from the second position to a third position by a distance of $a_3$. In the embodiment of FIG. 11A, the time separating each movement (e.g., 1050a, 1060a, and 1070a) may be constant time delays (e.g., $t_{1050a}$=T/4, $t_{1060a}$=2*T/4, and $t_{1070a}$=3*T/4). Thus, the amount of time delayed between each movement is the same and may be a function of the ringing period.

FIG. 11B is a diagram that illustrates introducing an optimized delay having a time lag in accordance with the four-step embodiment. FIG. 11B is similar to FIG. 11A, where distances $a_0$, $a_1$, $a_2$, $a_3$, and 1110 may be similar to those described in reference to FIG. 11A. Further, time delays 1140, 1150a, 1160a and 1170a represent similar times as discussed in FIG. 11A. However, the lens movements of FIG. 11B each include a corresponding lag in the time delay. Lens movement from first position to second position by distance $a_1$ may include a lag 1155 from time delay 1150a, such that an optimized time delay 1150b may improve ringing mitigation, as discussed in reference to FIG. 5A-5B related to the two-step damping solution. Similarly, lens movement from second position to target position by distance $a_2$ may include lag 1165 from time delay 1160a, such that an optimized time delay 1160b improve ringing mitigation. Lastly, lens movement from second position to target position by distance $a_3$ may include lag 1175 from time delay 1170a, such that an optimized time delay 1170b improve ringing mitigation. In the embodiment shown in FIG. 11B, the delays include negative time lags (e.g., the delay is shortened for a shorter delay) such that the lens ringing associated with each delay (e.g., $u_0(t)$, $u_1(t)$, $u_2(t)$, and $u_3(t)$) effectively cancel the ringing. However, it will be understood that the optimized time lags need not be negative, and may be positive delays (e.g., lengthening the respective time delay for each movement). The dampening parameters, including the timing delay and associated optimized lag, may be determined by the damping parameters determination module 145 and may be determined to effectively minimize the ringing of the lens while moving the target position.

Figure 12:
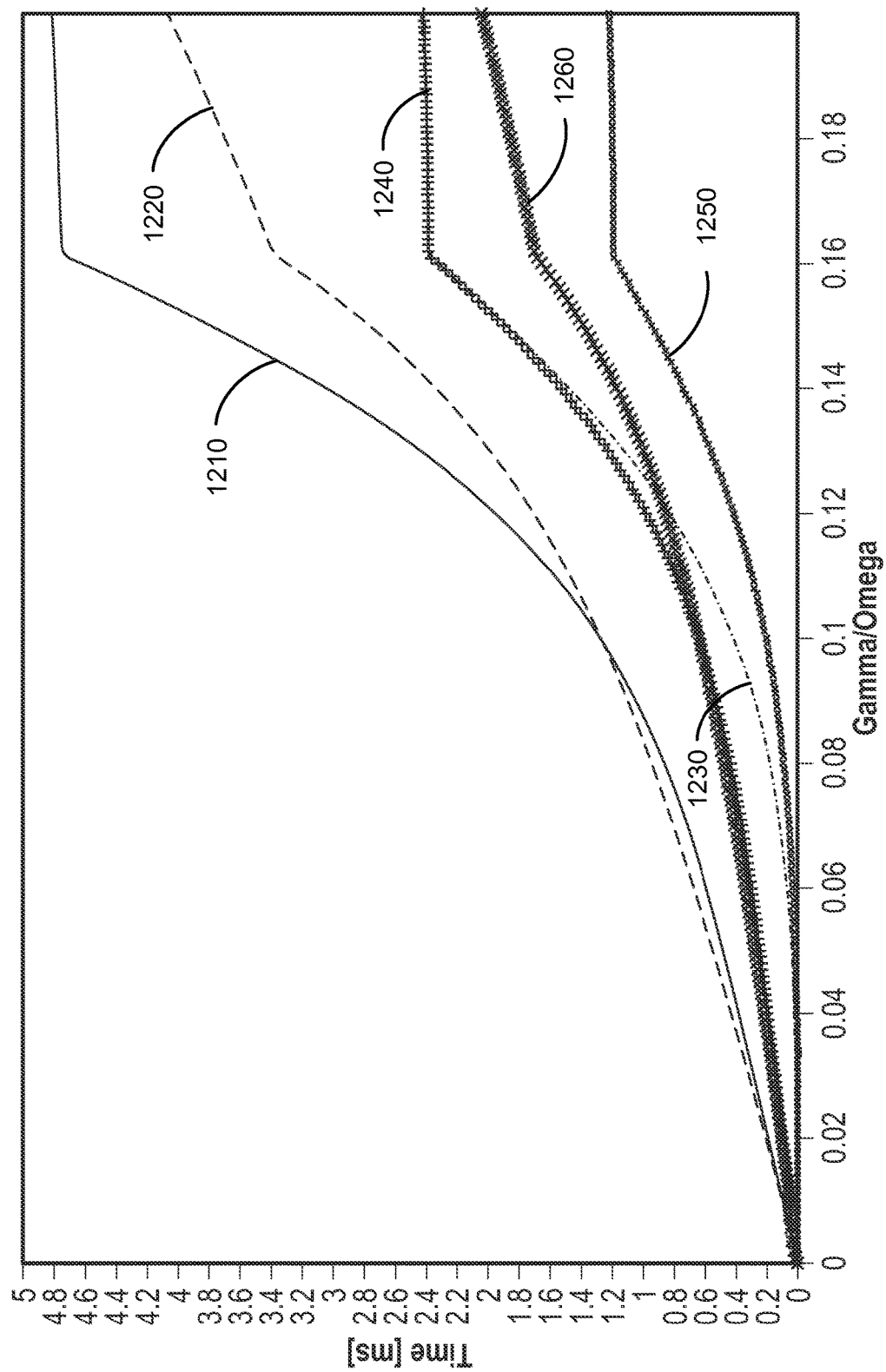
FIG. 12 illustrates time lag as a function of damping ratio in accordance with one embodiment.

FIG. 12 is a graph showing the optimal lag as a function of damping ratio in accordance with the three step damping embodiment. FIG. 12 is a graphical representation substantially similar to FIG. 10, but is related to the four-step damping solution. FIG. 12 illustrates that optimal lag to minimize lens ringing may be determined as a function of the angular velocity ($\omega_0$) and damping ratio ($\gamma$) for a four-step damping solution. Curve 1210 represents the amount of lag 1155 to subtract from time delay 1150a to reduce or mitigate lens vibrations and ringing. By subtracting the optimized lag 1155 from time delay 1150a as determined in FIG. 12, the optimized time delay is shown by curve 1150b. Curve 1220 represents the amount of lag 1165 to subtract from time delay 1160a to reduce or mitigate lens vibrations and ringing. By subtract the optimized lag 1165 from time delay 1160a as determined in FIG. 12, the optimal time delay is shown by 1260b. Curve 1230 represents the amount of lag 1175 to subtract from time delay 1170a to reduce or mitigate lens vibrations and ringing. By subtracting the optimized lag 1175 from time delay 1170a as determined in FIG. 12, the optimal time delay is shown by 1270b. The embodiment shown in curves 1210, 1220 and 1230 represents a ringing period of 20 ms. In some embodiments, the ring period and/or damping ratio may be characteristics of the actuator. Thus, the characteristics may be determined by the lens actuator characteristics module 140. In another embodiment, the actuator characteristics may be set to a default within the lens actuator characteristics determination module 145. The damping parameters, e.g., the lens displacements distances and time delay, may, in turn, be determined by the damping parameters determination module 145 based at least in part on the lens actuator characteristics as determined by the lens actuator determination module 140.

Further, FIG. 12 depicts that the lag curves to determine lags 1155, 1165, and 1175 are a function of the damping ratio at various ring periods of the four-step damping solution. Having determined the curves 1210, 1220 and 1230 through experimentation, the curves for any ring period may be calculated. For example, curves 1240, 1250 and 1260 represent optimized lag times to add to time delay 1150a, 1160a and 1170a, respectively, where the ring period of a given actuator is 10 ms. The method of calculating curves 1240, 1250 and 1260 is the same as described in reference to FIG. 10. Thus, curve 1240 may be calculated by multiplying curve 1210 by the ratio of the ring periods of curve 1240 and curve 1210. The optimized lag curves 1250 and 1260 may be calculated in a similar manner. Thus, where a lag curve is known for a given ring period the lag curve corresponding to a different ring period may be calculated based on the known curve, the known ring period and the sought after ring period lag curve.

Figure 13:
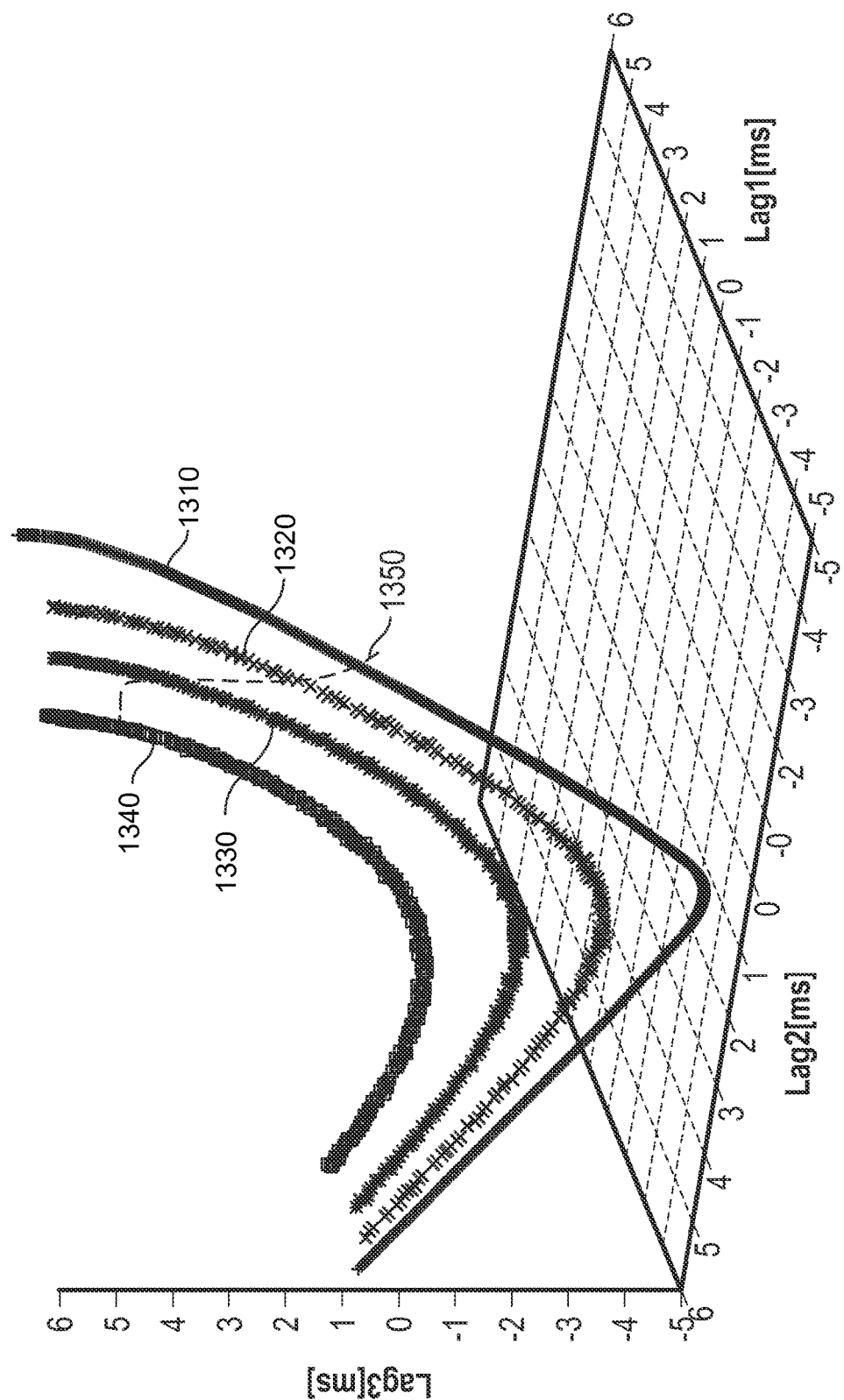
FIG. 13 illustrates the possible time lag combinations in accordance with on embodiment.

FIG. 13 illustrates the numerous possible time lag combinations in accordance with one embodiment. The graph shown in FIG. 13 depicts four curves 1310, 1320, 1330, and 1340 illustrating the many, possibly infinite, combinations of time lags 1155, 1165, and 1175 that may dampen lens vibrations or ringing. In the embodiment shown in FIG. 13, the scale polarity of the x-, y-, and z-axis are flipped, such that a lag3 (e.g., time delay 1175) value of 2 ms represents a negative 2 ms time delay to be subtracted from 1170a to obtain 1170b. Curve 1310 represents an embodiment where the damping ratio ($\gamma$) of the actuator is $0.035\omega_0$. Curve 1320 represents an embodiment where the damping ratio ($\gamma$) of the actuator is $0.100\omega_0$. Curve 1330 represents an embodiment where the damping ratio ($\gamma$) of the actuator is $0.150\omega_0$. Curve 1340 represents an embodiment where the damping ratio ($\gamma$) of the actuator is $0.200\omega_0$. Dotted line 1350 represents the previous lag curves 1210, 1220, and 1230 shown in FIG. 12. As can be seen in FIG. 13, the four step embodiment may have either positive or negative time lags. In one embodiment, the time lag3, such as 1175 in reference to FIG. 11B, may always be negative and as large a value as possible. In this way, the method may permit for the earliest settling time possible with minimum lens vibration. In the embodiment of FIG. 13, the actuator has a ring period of 20 ms and the points along each of the curves 1310, 1320, 1330, and 1340 represent values for each of the lags 1155, 1165, and 1175 of FIG. 11B, respectively, that result in vibration or ringing that is under 0. However, it will be understood that, as described above in reference to FIGS. 10 and 12, lag curves providing for damping lens vibration may be calculated for any ring period.

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A method for damping unwanted lens movement in an imaging device, comprising:
    determining a target distance to move a lens by an actuator to focus a scene on an image sensor, wherein moving the lens by the actuator the target distance imparts an unwanted vibration to the lens, the unwanted vibration described, in part, by a ringing angular velocity and a damping ratio;
    dividing the target distance into a plurality of steps having a first step and at least one subsequent step;
    moving the lens the first step, via the actuator, moving the lens the first step causing a first vibration;
    retrieving, from a memory, a damping parameter indicative of a time delay for each subsequent step, the damping parameter including an amount of time of a delay between each subsequent step and a time lag for each subsequent step that adjusts the amount of time of the delay between each subsequent step, the time lag being a function of the ringing angular velocity and the damping ratio of the unwanted vibration, and is based on the number of the plurality of steps; and
    repeating said moving the lens at least one subsequent step after delaying the subsequent step by one of the damping parameters, each moving of the lens a subsequent step causing a corresponding subsequent vibration, the damping parameters affecting the vibration caused by each step such that the first and subsequent vibrations at least in part modify each other to lower overall vibration.

2. The method of claim 1, wherein each of the plurality of steps are substantially equal.

3. The method of claim 1, wherein the first and subsequent vibrations are sinusoidal ringing imparted to the lens from the actuator, wherein the sinusoidal ringing is related to vibrations and friction resulting from said moving the lens.

4. The method of claim 3, wherein the sinusoidal ringing is characterized by at least one characteristic of the actuator and is characterized by:

$$u_N(t) = A\{1 - e^{-\gamma t} \cos(Kt)\}, K = \sqrt{\omega_0^2 - \gamma^2}$$

wherein N is one of the first and subsequent steps, A is the target distance, $\omega_0$ is the ringing angular velocity, and $\gamma$ is the damping ratio; and wherein the ringing angular velocity and damping ratio are related to the vibrations and friction resulting from said moving the lens.

5. The method of claim 4, further comprising capturing the scene on the image sensor, the scene being focused as a result of said moving the lens and the first and subsequent vibrations being modified within a single ring period.

6. The method of claim 4, further comprising a configuration period, wherein the configuration period is related to the amount of time to move the lens the target distance and for the first and subsequent vibrations to settle, wherein a configuration period is equal to a ring period.

7. The method of claim 3, wherein the first and subsequent vibrations modify each other such that the first and subsequent vibrations substantially cancel each other out.

8. The method of claim 1, wherein the damping ratio of the unwanted vibration is related to friction resulting from said moving the lens.

9. The method of claim 1, wherein the plurality of steps includes at least a first and a second step.

10. The method of claim 9, wherein the first and second steps are based on at least one of the ringing angular velocity and the damping ratio of the unwanted vibration.

11. The method of claim 9, wherein the first and second steps are characterized by:

$$a_0 + a_1 = A \text{ and}$$

$$\frac{a_0}{a_1} = e^{\pi \gamma / \omega_0}$$

wherein A is the target distance, $a_0$ is the first step, $a_1$ is the second step, $\omega_0$ is the ringing angular velocity, and $\gamma$ is the damping ratio; and wherein the ringing angular velocity and damping ratio are related to the vibrations and friction resulting from said moving the lens.

12. The method of claim 1, wherein the plurality of steps includes at least three steps, having at least a first, second, and third steps.

13. The method of claim 12, wherein the damping parameters for the plurality of steps include at least a first and second delay having a first and a second lag, wherein the first and second lag is uniquely a function of at least one of the ringing angular velocity and the damping ratio of the unwanted vibration.

14. The method of claim 1, wherein the plurality of steps includes at least four steps, having at least a first, second, third and fourth step.

15. The method of claim 14, wherein the damping parameters for the plurality of steps include at least a first, second, and third delay having a first, second, and third lag, wherein the first, second, and third lags are selected as a function of at least one of the ringing angular velocity and the damping ratio of the unwanted vibration to minimize vibrations in the lens.

16. A method for damping unwanted lens movement in an imaging device, comprising:
    determining a target distance to move a lens by an actuator to focus a scene on an image sensor;
    dividing the target distance into a plurality of steps having a first step and at least one subsequent step;
    moving the lens the first step, via the actuator, moving the lens the first step causing a first vibration;
    retrieving, from a memory, a damping parameter indicative of a time delay before each subsequent step, the damping parameter being based on at least one characteristic of the actuator and on the number of the plurality of steps and comprising at least a first and a subsequent time delay having a first and a subsequent lag, the first and subsequent lags being uniquely based on the at least one characteristic of the actuator and are negative lags being subtracted from the first and subsequent delays respectively; and
    repeating said moving the lens at least one subsequent step after delaying the subsequent step by one of the damping parameters, each moving of the lens a subsequent step causing a corresponding subsequent vibration, the damping parameters affecting the vibration caused by each step such that the first and subsequent vibrations at least in part modify each other to lower overall vibration.

17. An apparatus for damping lens movement imparted on a lens by an actuator in an imaging device, comprising:
    a lens;

a lens actuator;
a memory circuit storing damping instructions;
at least one processor, operably coupled to the lens actuator and the memory circuit, and configured by the instructions to at least:
  determine a current lens position and a target lens position, wherein the distance between the current lens position and target lens position is a target distance, wherein if the lens actuator moves the lens the target distance an unwanted vibration is imparted to the lens, the unwanted vibration described, in part, by a ringing angular velocity and a damping ratio;
  determine damping parameters as a function of the ringing angular velocity and the damping ratio of the unwanted vibration, the damping parameters include:
    a plurality of steps having a total distance that is equal to the target distance, wherein the damping parameters are based on the number of the plurality of steps;
    an amount of time of a delay between each of the plurality of steps; and
    a time lag for each of the plurality of steps that adjusts the amount of time of the delay between each of the plurality of steps, the time lag being a function of the ringing angular velocity, the damping ratio of the unwanted vibration, and the number of the plurality of steps;
    wherein the damping parameters are determined to substantially cancel out vibration imparted to the lens due to the actuator moving the lens of each of the plurality of steps;
  determine lens movement parameters based on the damping parameters; and
  move the lens to autofocus an image based on the lens movement parameters.

18. The apparatus of claim 17, wherein the at least one processor is further configured to determine one or more characteristics of the actuator, wherein the actuator characteristics are stored in the memory circuit of the apparatus.

19. The apparatus of claim 18, wherein the at least one processor is configured to perform a calibration process to determine characteristic of the actuator.

20. The apparatus of claim 18, wherein the characteristic of the actuator includes at least a ring period, the damping ratio, and the ringing angular velocity, wherein the damping ratio is related to the vibration and friction imparted to the lens by the actuator moving the lens and the ringing angular velocity is related to the ring period.

21. An apparatus for damping lens ringing imparted on a lens in an imaging device, comprising:
  a means for determining a current lens position and a target lens position, wherein the distance between the current lens position and target lens position is a target distance, wherein if the lens actuator moves the lens the target distance an unwanted vibration is imparted to the lens, the unwanted vibration described, in part, by a ringing angular velocity and a damping ratio;
  a means for determining damping parameters as a function of the ringing angular velocity and the damping ratio of the unwanted vibration, the damping parameters include:
    a plurality of steps having a total distance that is equal to the target distance, wherein the damping parameters are based on the number of the plurality of steps;
    an amount of time of a delay between each of the plurality of steps; and
    a time lag for each of the plurality of steps that adjusts the amount of time of the delay between each of the plurality of steps, the time lag being a function of the ringing angular velocity, the damping ratio of the unwanted vibration, and the number of the plurality of steps;
    wherein the damping parameters are determined to substantially cancel out lens vibrations imparted to the lens as a result of the actuator moving the lens each of the plurality of steps;
  a means for determining lens movement parameters based on the damping parameters; and
  a means for moving the lens to autofocus an image based on the lens movement parameters.

22. A non-transitory computer readable medium comprising instructions that when executed cause a processor to perform a method of autofocusing a lens, the method comprising:
  determining a target distance to move a lens by an actuator toward or away from an image sensor to focus a scene on the image sensor, wherein moving the lens by the actuator the target distance imparts an unwanted vibration to the lens, the unwanted vibration described, in part, by a ringing angular velocity and a damping ratio;
  dividing the target distance into a plurality of steps having at least a first and subsequent step;
  moving the lens by the first step, via the actuator, the moving of the first step causing a first vibration;
  retrieving, from a memory, a damping parameter indicative of time delay for each subsequent step, the damping parameter including the amount of time of a delay between each subsequent step and a time lag for each subsequent step that adjusts the amount of time of the delay between each subsequent step, the time lag being a function of the ringing angular velocity and the damping ratio of the unwanted vibration, and is based on the number of steps; and
  repeating said moving the lens at least one subsequent step after delaying the subsequent step by one of the damping parameters, each moving of the lens a subsequent step causing a corresponding subsequent vibration, the damping parameters affecting the vibration caused by each step such that the first and subsequent vibrations at least in part modify each other to lower overall vibration.

23. The non-transitory computer readable medium of claim 22, wherein the first and subsequent vibrations are a sinusoidal ringing, wherein the sinusoidal ringing is related to vibrations and friction resulting from the said moving the lens.

24. The non-transitory computer readable medium of claim 23, wherein the characteristic of the actuator include the ringing angular velocity, the damping ratio, and a ring period.

25. The non-transitory computer readable medium of claim 24, further comprising capturing the scene on the image sensor, the scene being focused as a result of said moving the lens and the first and subsequent vibrations being modified within a single ring period.

26. The non-transitory computer readable medium of claim 22, wherein the damping parameter is a time delay.

* * * * *